(12) United States Patent
Conrad

(10) Patent No.: US 12,156,628 B2
(45) Date of Patent: Dec. 3, 2024

(54) SURFACE CLEANING APPARATUS HAVING A BRUSH MOTOR INTERNAL OF A ROTATING BRUSH AND BRUSH MOTOR FOR DRIVING A ROTATABLE BRUSHING MEMBER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 18/330,137

(22) Filed: Jun. 6, 2023

(65) Prior Publication Data

US 2023/0309767 A1    Oct. 5, 2023

Related U.S. Application Data

(63) Continuation of application No. 17/231,729, filed on Apr. 15, 2021, now Pat. No. 11,707,170.

(51) Int. Cl.
*A47L 9/04* (2006.01)
*A47L 9/28* (2006.01)

(52) U.S. Cl.
CPC .......... *A47L 9/0411* (2013.01); *A47L 9/0477* (2013.01); *A47L 9/2831* (2013.01); *A47L 9/2847* (2013.01); *A47L 9/2889* (2013.01)

(58) Field of Classification Search
CPC .......... H02K 1/17; H02K 1/2706; H02K 7/14; H02K 7/145; H02K 2207/00;
(Continued)

(56) References Cited

U.S. PATENT DOCUMENTS 7,334,987 B2   2/2008  Oh et al.
8,593,019 B2   11/2013 Chung et al.
(Continued)

FOREIGN PATENT DOCUMENTS

GB    2604165 A  *  8/2022  ............. A47L 5/00

OTHER PUBLICATIONS

International Search Report and Written Opinion, received in connection to international patent application Na PCT/3A2021/050434, mailed on Jul. 5, 2021.

*Primary Examiner* — Brian D Keller
*Assistant Examiner* — Tim Brady
(74) *Attorney, Agent, or Firm* — Philip C. Mendes da Costa; BERESKIN & PARR LLP/S.E.N.C.R.L., s.r.l.

(57) ABSTRACT

A surface cleaning apparatus is provided. The surface cleaning apparatus includes a dirt inlet, a rotatable brushing member, and a brush motor drivingly connected to the rotatable brushing member. The brush motor includes a plurality of field coils, a first motor sub-unit, a second motor sub-unit, and a motor controller. The first motor sub-unit includes a first rotor portion, a first stator portion, and a first field coil. The second motor sub-unit includes a second rotor portion, a second stator portion, and a second field coil. The first and second rotor portions are rotatable about a motor axis and are drivingly connected to the brushing member. The second motor sub-unit is axially spaced along the motor axis from the first motor sub-unit. The motor controller is operable to direct electric current through the plurality of field coils generating magnetic fields and driving rotation of the rotor portions.

20 Claims, 16 Drawing Sheets

(58) Field of Classification Search
CPC .... H02K 2213/03; H02K 37/04; H02K 37/10; H02P 6/22; H02P 6/30; A47L 9/0411; A47L 9/0477
USPC ......... 15/383, 389, 393, 394, 395, 396, 376, 15/377, 412; 310/50
See application file for complete search history.

(56) References Cited

U.S. PATENT DOCUMENTS

| | | |
|---|---|---|
| 8,950,529 B2 | 2/2015 | Ross |
| 9,005,324 B2 | 4/2015 | Smith |
| 9,717,385 B2 | 8/2017 | Liter |
| 10,517,448 B2 | 12/2019 | Shiozawa et al. |
| 2003/0102751 A1 | 6/2003 | Bryant |
| 2003/0188397 A1* | 10/2003 | Syverson ............... A47L 9/0411 15/389 |
| 2011/0303239 A1* | 12/2011 | Harrison ............... A47L 9/0438 15/389 |
| 2013/0171013 A1 | 7/2013 | Jang et al. |
| 2014/0086725 A1 | 3/2014 | Shi |
| 2015/0308456 A1* | 10/2015 | Thompson ............... F04D 17/12 417/244 |
| 2017/0040920 A1 | 2/2017 | Bailey et al. |
| 2017/0273523 A1* | 9/2017 | Kasper ................... A47L 9/1683 |

* cited by examiner

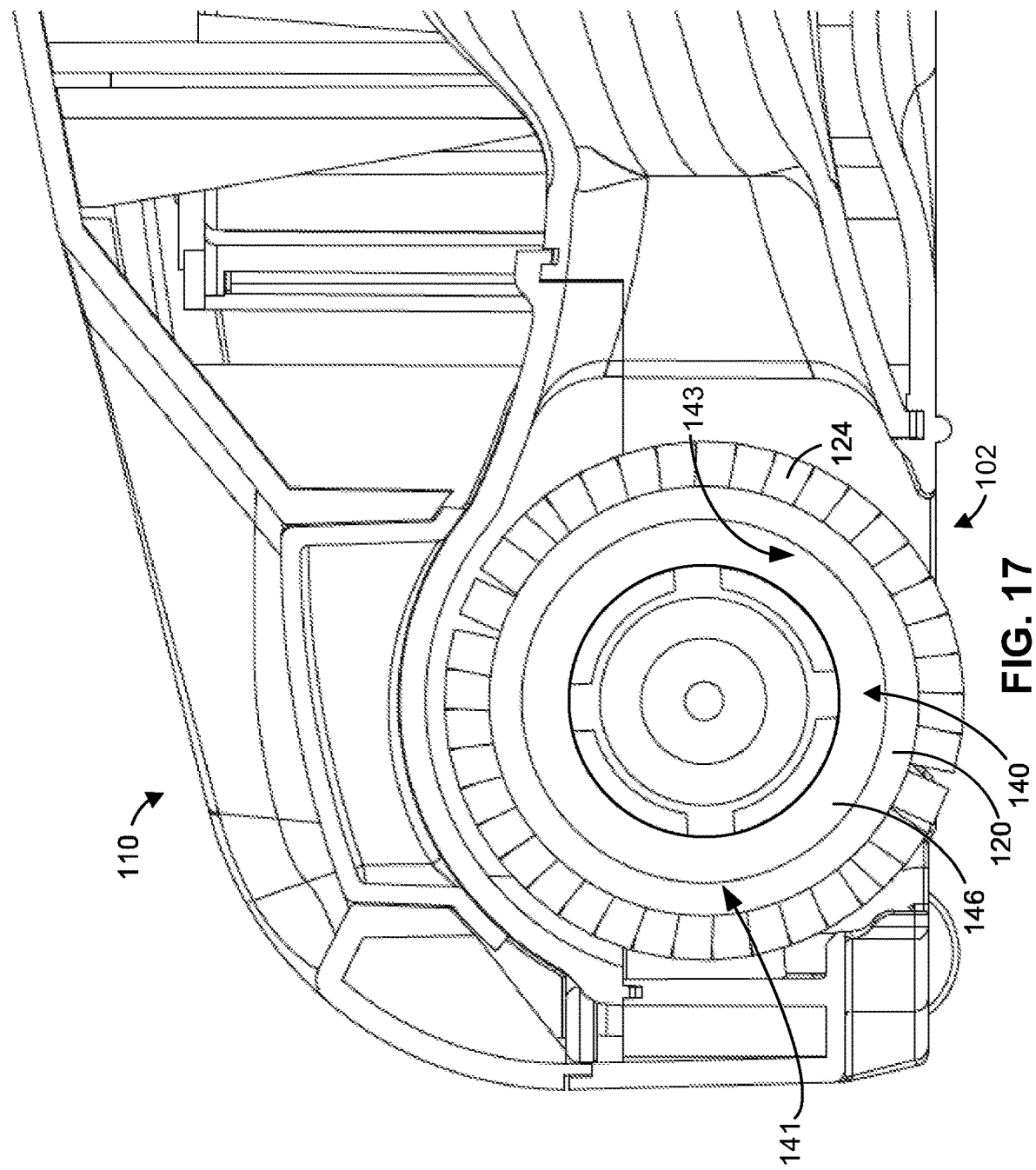

SURFACE CLEANING APPARATUS HAVING A BRUSH MOTOR INTERNAL OF A ROTATING BRUSH AND BRUSH MOTOR FOR DRIVING A ROTATABLE BRUSHING MEMBER

CROSS-REFERENCE TO RELATED APPLICATION

This is a continuation of U.S. patent application Ser. No. 17/231,729, filed on Apr. 15, 2021, the content of which is incorporated herein by references in its entirety.

FIELD

This application relates to motors for use with household appliances, and more particularly to brush motors for driving rotatable brushing members.

INTRODUCTION

The following is not an admission that anything discussed below is part of the prior art or part of the common general knowledge of a person skilled in the art.

A surface cleaning apparatus can include a rotatable brushing member for extracting or loosening dirt from a surface so that the dirt can be more easily collected by the surface cleaning apparatus. The rotatable brushing member may be referred to as a brush roll or brush bar. The brushing member can include bristles, wire, or other filaments extending therefrom that sweep, beat, or otherwise agitate dirt when the brushing member is rotated. The brushing member can be driven to rotate by a brush motor.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, there is provided a motor for driving a rotatable output member of a household appliance, such as a brushing member of a surface cleaning apparatus. The motor includes a plurality of motor sub-units that are axially spaced along a motor axis. Each motor sub-unit includes a rotor portion and a stator portion. The rotor portion is rotatable about the motor axis. Each rotor portion is operable to generate a rotor magnetic field, and each stator portion is operable to generate an opposing stator magnetic field, thereby driving rotation of the rotor portions. The rotor portions are drivingly connected to the rotatable output member such that rotation of the rotor portions drives rotation of the output member.

An advantage of this aspect is that the total heat generated by the motor sub-units can be less than that of an equivalent single unit motor. Moreover, the heat generated by the motor sub-units can be distributed along the length of the motor, which may promote greater heat dissipation. Additionally, the motor sub-units can be implemented using smaller magnets as compared to an equivalent single unit motor, simplifying the manufacturing of each motor unit.

The profile of the motor can also allow the motor to be disposed inside of the rotatable output member. That is, the rotatable output member may house the motor used to drive the output member. This can reduce the overall size of the household appliance and/or allow additional components to be installed inside the household appliance, since the motor does not take up additional space within the household appliance.

In accordance with this aspect, there is provided a surface cleaning apparatus comprising:
 (a) a dirt inlet;
 (b) a rotatable brushing member having first and second longitudinally opposed ends and a brush member rotational axis extending longitudinally between the first and second opposed ends; and
 (c) a brush motor drivingly connected to the rotatable brushing member, the brush motor comprising:
  (i) a plurality of field coils;
  (ii) a first motor sub-unit comprising a first rotor portion, a first stator portion, and a first field coil of the plurality of field coils, wherein the first field coil is coupled to one of the first rotor portion and the first stator portion, and the first rotor portion is rotatable about a motor axis;
  (iii) a second motor sub-unit comprising a second rotor portion, a second stator portion, and a second field coil of the plurality of field coils, wherein the second field coil is coupled to one of the second rotor portion and the second stator portion, and the second rotor portion is rotatable about the motor axis, the second motor sub-unit being axially spaced along the motor axis from the first motor sub-unit, wherein each rotor portion is operable to generate a rotor magnetic field, and each stator portion is operable to generate a stator magnetic field opposing the rotor magnetic field of a corresponding rotor portion thereby driving rotation of the rotor portions; and,
  (iv) a motor controller operable to direct electric current through the plurality of field coils thereby generating at least one of the stator magnetic fields and the rotor magnetic fields and driving rotation of the rotor portions;
wherein the rotor portions are drivingly connected to the brushing member such that rotation of the rotor portions drives rotation of the brushing member.

In any embodiment, the brushing member may include a member cavity defining an inner member volume surrounded by the brushing member and the brush motor may be disposed within the inner member volume.

In any embodiment, the brushing member may include one or more flaps extending from the brushing member into the inner member volume, and the one or more flaps may be thermally coupled to the brush motor within the inner member volume thereby promoting heat transfer between the brush motor and the brushing member.

In any embodiment, the surface cleaning apparatus may further include a thermally conductive fill enclosed within the inner member volume, the thermally conductive fill promoting heat transfer between the brush motor and the brushing member.

In any embodiment, the first motor sub-unit may be drivingly connected to the second motor sub-unit and the second motor sub-unit may be drivingly connected to the brushing member.

In any embodiment, the surface cleaning apparatus may define a cleaning head housing; and the brush motor and brushing member may be both disposed within the cleaning head housing.

In any embodiment, the brush member axis and the motor axis may be parallel.

In any embodiment, each rotor portion may be at least partially surrounded by a corresponding stator portion.

In any embodiment, the brush motor may further include: a third motor sub-unit including a third rotor portion, a third stator portion, and a third field coil of the plurality of field coils. The third field coil may be coupled to one of the third rotor portion and the third stator portion and the third motor sub-unit may be axially spaced along the motor axis from the first motor sub-unit and the second motor sub-unit.

In any embodiment, the first motor sub-unit, second motor sub-unit and the third motor sub-unit may be arranged linearly.

In any embodiment, each field coil may be angularly spaced apart from each other field coil in a circumferential direction about the motor axis.

In any embodiment, the motor controller may be operable to selectively direct the electric current to each of the field coils based on the angular position of the rotor portions.

In accordance with an aspect of this disclosure, which may be used alone or in combination with any other aspect, there is also provided a brush motor positionable inside a rotatable brushing member, the brush motor comprising:
 (a) a plurality of field coils;
 (b) a first motor sub-unit comprising a first rotor portion, a first stator portion, and a first field coil of the plurality of field coils, wherein the first field coil is coupled to one of the first rotor portion and the first stator portion, and the first rotor portion is rotatable about a motor axis;
 (c) a second motor sub-unit comprising a second rotor portion, a second stator portion, and a second field coil of the plurality of field coils, wherein the second field coil is coupled to one of the second rotor portion and the second stator portion, and the second rotor portion is rotatable about the motor axis, the second motor sub-unit being axially spaced along the motor axis from the first motor sub-unit, wherein each rotor portion is operable to generate a rotor magnetic field, and each stator portion is operable to generate a stator magnetic field opposing the rotor magnetic field of a corresponding rotor portion thereby driving rotation of the rotor portions; and,
 (d) a motor controller operable to direct electric current through the plurality of field coils thereby generating at least one of the stator magnetic fields and the rotor magnetic fields and driving rotation of the rotor portions;
wherein the rotor portions are drivingly connected to the brushing member such that rotation of the rotor portions drives rotation of the brushing member.

In any embodiment, each rotor portion may be at least partially surrounded by a corresponding stator portion.

In any embodiment, the brush motor may further include a third motor sub-unit including a third rotor portion, a third stator portion, and a third field coil of the plurality of field coils. The third field coil may be coupled to one of the third rotor portion and the third stator portion and the third motor sub-unit may be axially spaced along the motor axis from the first motor sub-unit and the second motor sub-unit.

In any embodiment, the first motor sub-unit, second motor sub-unit and the third motor sub-unit may be arranged linearly.

In any embodiment, each field coil may be angularly spaced apart from each other field coil in a circumferential direction about the motor axis.

In any embodiment, the motor controller may be operable to selectively direct the electric current to each of the field coils based on the angular position of the rotor portions.

In any embodiment, the first motor sub-unit may be drivingly connected to the second motor sub-unit and the second motor sub-unit may be drivingly connected to the brushing member.

In accordance with an aspect of this disclosure, which may be used alone or in combination with any other aspect, there is also provided a motor for use with a household appliance comprising a rotatable output member, the motor comprising:
 (a) a plurality of field coils;
 (b) a first motor sub-unit comprising a first rotor portion, a first stator portion, and a first field coil of the plurality of field coils, wherein the first field coil is coupled to one of the first rotor portion and the first stator portion, and the first rotor portion is rotatable about a motor axis;
 (c) a second motor sub-unit comprising a second rotor portion, a second stator portion, and a second field coil of the plurality of field coils, wherein the second field coil is coupled to one of the second rotor portion and the second stator portion, and the second rotor portion is rotatable about the motor axis, the second motor sub-unit being axially spaced along the motor axis from the first motor sub-unit, wherein each rotor portion is operable to generate a rotor magnetic field, and each stator portion is operable to generate a stator magnetic field opposing the rotor magnetic field of a corresponding rotor portion thereby driving rotation of the rotor portions; and,
 (d) a motor controller operable to direct electric current through the plurality of field coils thereby generating at least one of the stator magnetic fields and the rotor magnetic fields and driving rotation of the rotor portions;
wherein the rotor portions are drivingly connected to the output member such that rotation of the rotor portions drives rotation of the output member.

In any embodiment, each rotor portion may be at least partially surrounded by a corresponding stator portion.

In any embodiment, the motor may further include a third motor sub-unit including a third rotor portion, a third stator portion, and a third field coil of the plurality of field coils. The third field coil may be coupled to one of the third rotor portion and the third stator portion and the third motor sub-unit may be axially spaced along the motor axis from the first motor sub-unit and the second motor sub-unit.

In any embodiment, the first motor sub-unit, second motor sub-unit and the third motor sub-unit may be arranged linearly.

In any embodiment, each field coil may be angularly spaced apart from each other field coil in a circumferential direction about the motor axis.

In any embodiment, the motor controller may be operable to selectively direct the electric current to each of the field coils based on the angular position of the rotor portions.

In any embodiment, the first motor sub-unit may be drivingly connected to the second motor sub-unit and the second motor sub-unit may be drivingly connected to the brushing member.

It will be appreciated by a person skilled in the art that an apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
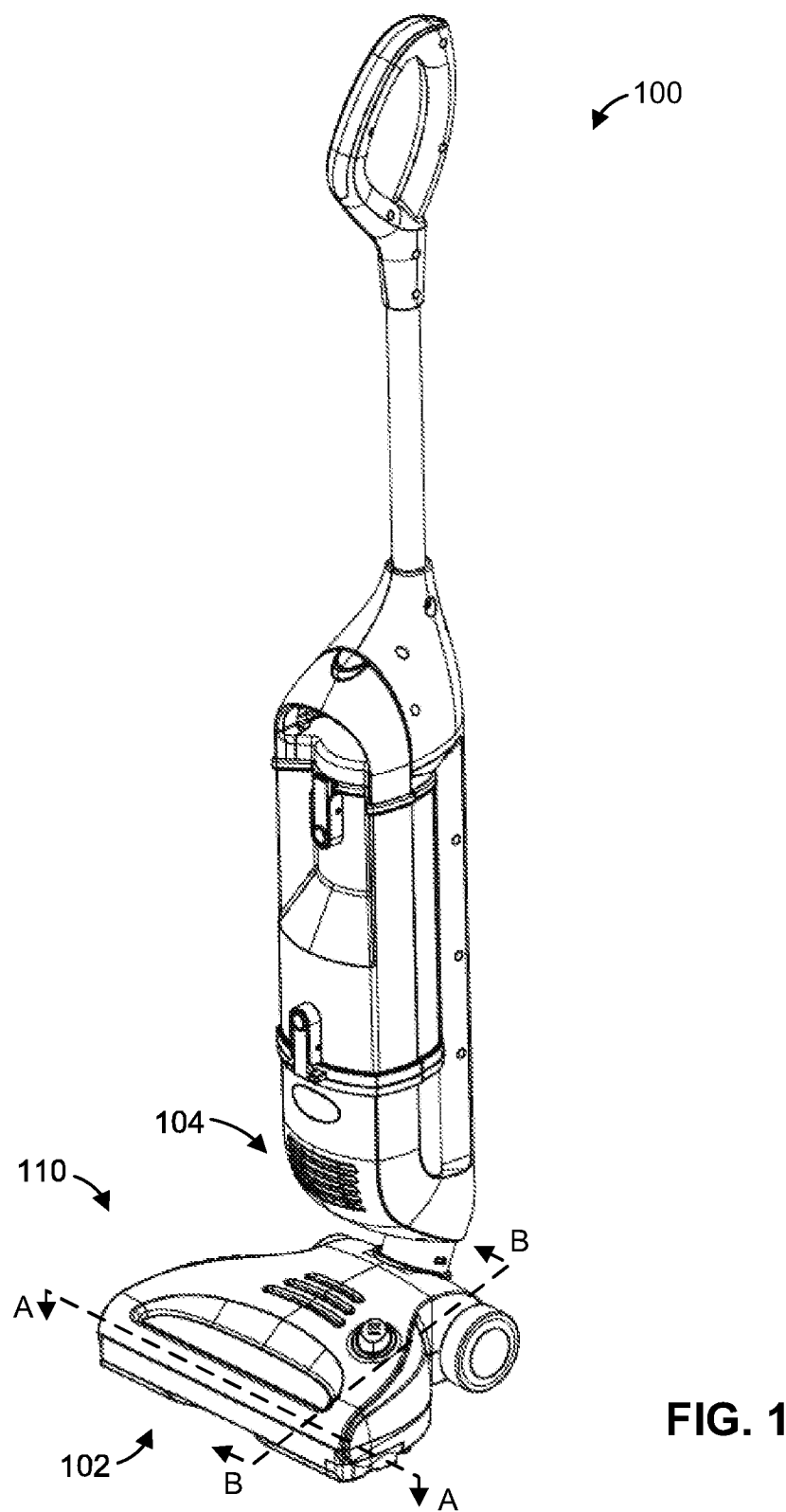
FIG. 1 is a top front perspective view of an example surface cleaning apparatus, in accordance with an embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

General Description of a Surface Cleaning Apparatus

The following is a general description of a surface cleaning apparatus having a rotatable brushing member and a brush motor, which provides a basis for understanding several of the features that are discussed herein. The following description contains various features which may be used individually or in any combination or sub-combination. It should be appreciated that, in some embodiments, aspects disclosed herein may be used with other household apparatuses, including, for example, household apparatuses having a rotatable output member such as power tools (e.g., power drills and drivers, power sanders etc.), kitchen appliances (e.g., mixers), hair dryers and so forth.

Figure 2:
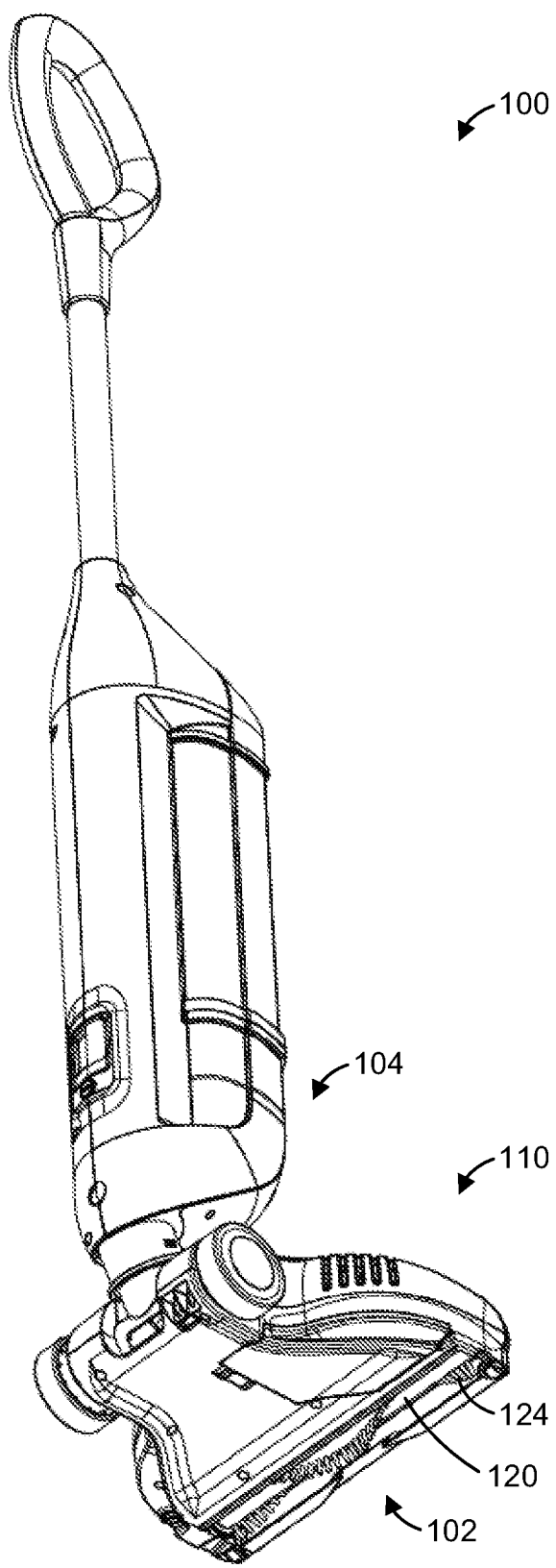
FIG. 2 is a bottom rear perspective view of the surface cleaning apparatus shown in FIG. 1.

Referring to FIGS. 1 and 2, there is shown an example surface cleaning apparatus 100. In the illustrated example, the surface cleaning apparatus 100 is an upright vacuum cleaner. However, the surface cleaning apparatus 100 can be any type of surface cleaning apparatus including, for example, a hand vacuum cleaner, a stick vacuum cleaner, a canister vacuum cleaner, a robotic vacuum cleaner, an extractor, a sweeper, or a wet/dry type vacuum cleaner. Further, to motor disclosed herein may be used in an accessory provided for a household appliance, such as a surface cleaning apparatus. For example, the accessory may be any surface cleaning head that has a rotatable brushing member.

The surface cleaning apparatus 100 includes a dirt inlet 102 for receiving dirt from a surface. In the illustrated example, the dirt inlet 102 is a dirty air inlet through which dirty air can be suctioned. As shown, the surface cleaning apparatus 100 can also include a clean air outlet 104 and an air flow path extending between the clean air outlet 104 and the dirty air inlet 102. At least one suction motor and at least one air treatment member can be provided in the air flow path. The air treatment member may be any suitable air treatment member, including, for example, one or more cyclones, filters, bags and other dirt separation devices. In addition to the at least one air treatment member, one or more pre-motor filters (positioned in the air flow path between the air treatment member and the suction motor) and/or one or more post-motor filters (positioned in the air flow path between the suction motor and the clean air outlet) may be provided.

The surface cleaning apparatus 100 also includes a rotatable brushing member 120, which may also be referred to as a brush roll or brush bar. As shown, the brushing member 120 can include bristles, wire, other filaments, flexible strips extending therefrom, or any other floor contacting member known in the art 124, for extracting, collecting, loosening or the like dirt from a surface.

In operation, the brushing member 120 can be rotated so that the bristles 124 brush, sweep, beat, or otherwise agitate dirt from the surface so that the dirt can be more easily collected by the dirt inlet 102. The brushing member 120 can be driven to rotate by a brush motor (see e.g., FIG. 3), examples of which will be described in greater detail with regard to FIGS. 3 to 16.

As shown, the surface cleaning apparatus 100 can include a surface cleaning head 110. Surface cleaning head 110 can house the brushing member 120 and the brush motor. The dirt inlet 102 can be provided in the surface cleaning head.

However, it should be appreciated that dirt inlet 102, the brushing member 120, and the brush motor need not be positioned in the surface cleaning head 110 and may be located at one or more different parts of the surface cleaning apparatus 100. Similarly, although the brushing member 120 is shown located at the dirt inlet 102 in surface cleaning apparatus, it should be understood that in alternative embodiments the dirt inlet 102 may be spaced apart or otherwise located apart from the brushing member 120.

It should also be appreciated that alternate types of surface cleaning apparatuses may be used with embodiments described herein. For example, a sweeper-style surface cleaning apparatus may be used with embodiments described herein. In such embodiments, a surface cleaning apparatus may omit the air flow path and clean air outlet and simply collect dirt in a dirt collection chamber or tray.

Brush Motor

The following is a description of a motor that may be used to drive a rotatable output member such as a rotatable brush member. The following description contains various features which may be used individually or in any combination or sub-combination. For simplicity, the motor is described in the context of a brush motor for a surface cleaning apparatus. However, it should be appreciated that, in some embodiments, aspects disclosed herein may be used with other household apparatuses, including, for example, to drive a rotatable output member of a household apparatus.

Referring now to FIGS. 3 to 7, there is shown an example brush motor 140. As shown in the example of FIGS. 3-7, brush motor 140 is configured to drive brushing member 120 of surface cleaning apparatus 100. However, it should be appreciated that brush motor 140 may also be used to drive rotatable output members for other appliances.

Figure 6:
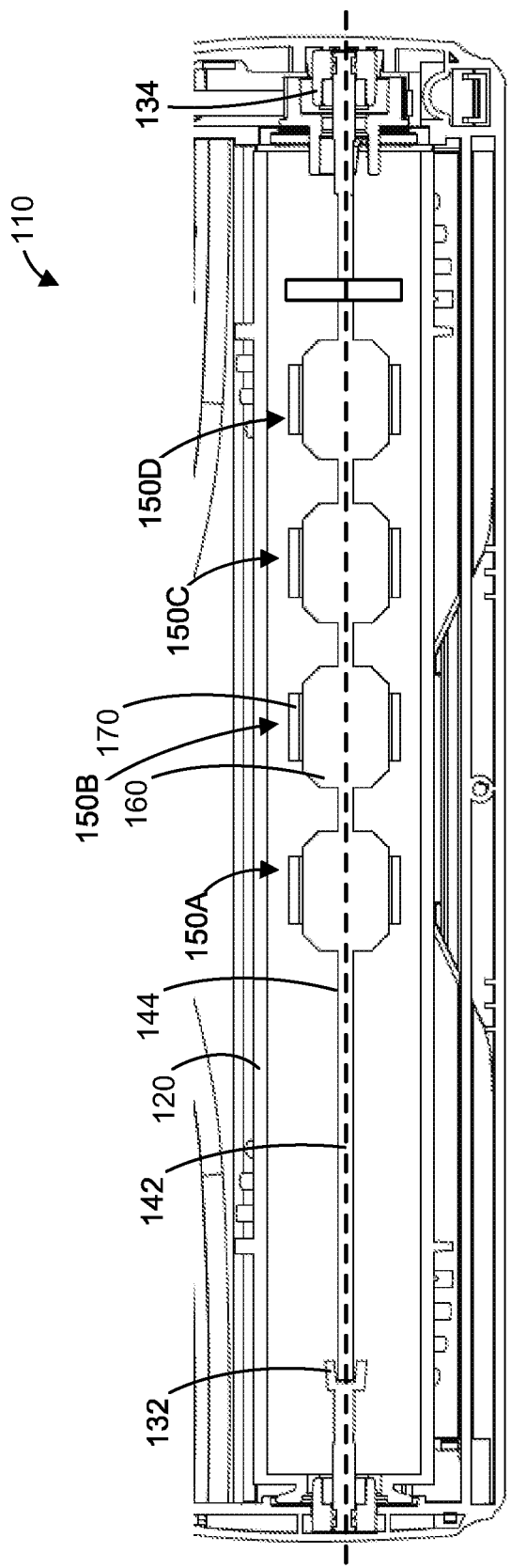
FIG. 6 is a partial section view of the surface cleaning head of the surface cleaning apparatus shown in FIG. 1 taken along line A-A in FIG. 1, with the housing of the brush motor omitted.

In general, brush motor 140 can include a plurality of motor sub-units 150 (see, e.g., FIG. 6). The motor sub-units 150 can be configured to cooperate to drive a rotatable output member coupled to brush motor 140.

An advantage of this configuration is that the total heat generated by the motor sub-units 150 may be less than that of an equivalent single unit motor. The heat generated by each motor sub-unit 150 is generally proportional to the square of the electrical current used by that motor sub-unit 150. Hence, dividing current among multiple motor sub-units 150 may generate less heat than supplying the same amount of current to a single unit motor. For example, dividing current among four motor sub-units 150 can generate approximately four times less heat as compared to applying the same amount of current to an equivalent single unit motor.

Another advantage of this configuration is that smaller, less powerful magnetic elements can be used as compared to an equivalent single unit motor. An equivalent single unit motor may require larger, more powerful magnetic elements, which may be more expensive than smaller, less powerful magnetic elements. By using a larger number of less powerful magnetic elements, manufacturing costs can be reduced. At the same time, an equivalent torque output can be generated by the multiple motor sub-units 150 as would otherwise be provided by a larger, single motor unit.

Another advantage of this configuration is that the diameter of the brush motor 140 may be smaller since each sub-unit may have a smaller diameter than by using larger number of less powerful magnetic elements. Accordingly, the brush motor may be positioned internal of brushing member 120.

Figure 7:
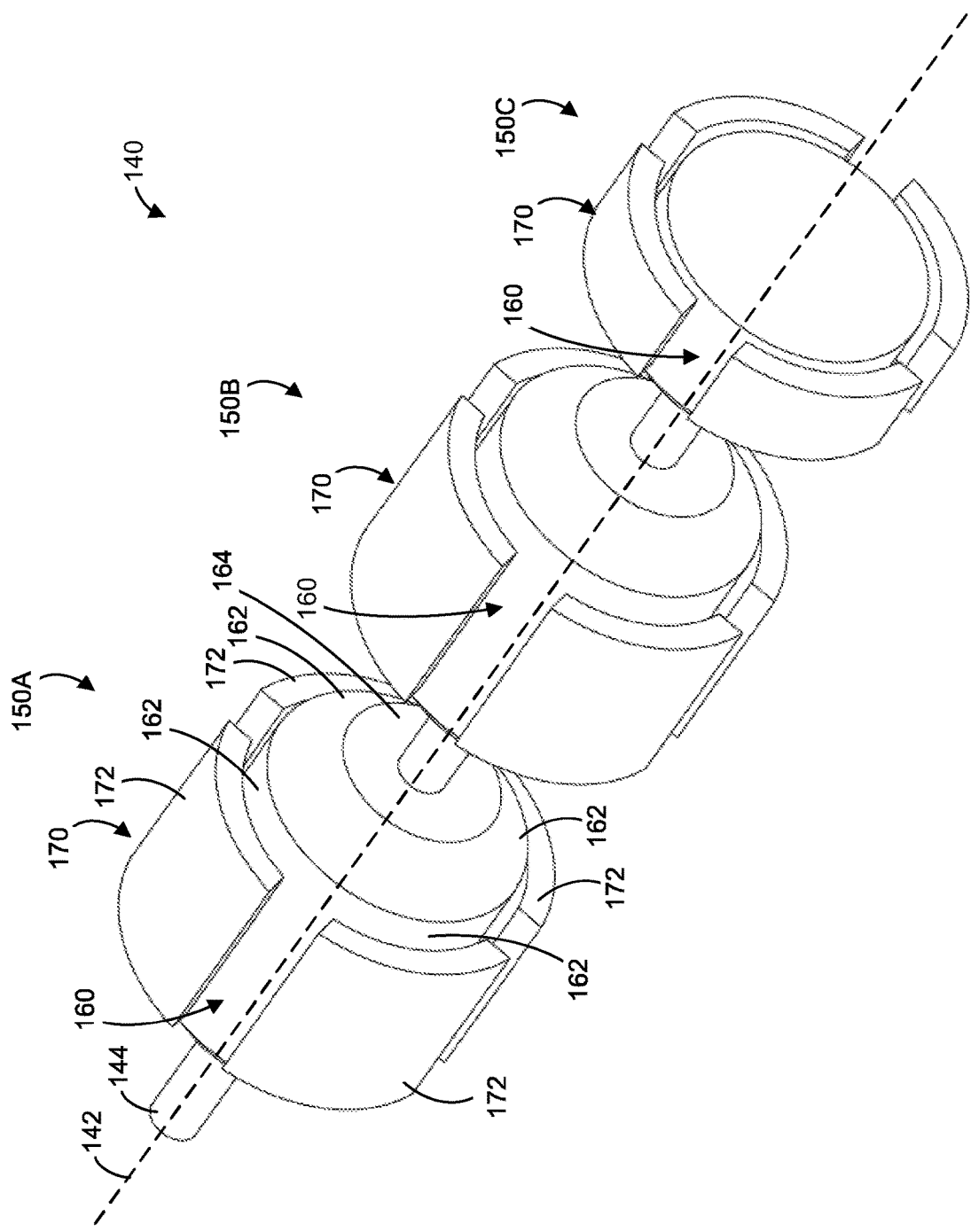
FIG. 7 is a partial perspective view of the brush motor shown in FIG. 4, with the housing omitted.

In some examples, the brush motor 140 can extend longitudinally along a motor axis 142. As shown in the example of FIGS. 6 and 7, the plurality of motor sub-units 150 are axially spaced apart from one another along the motor axis 142. An advantage of this configuration is that the heat generated by the motor sub-units 150 can be distributed along the length of the motor 140, which may allow the heat to be more easily dissipated. In contrast, an equivalent single unit motor (or a plurality of adjacent and/or partially axially overlapping motor sub-units) may produce heat in a more concentrated region.

In the example of FIGS. 6 and 7, the individual motor sub-units 150 are axially separated from one another. Alternately, the motor sub-units 150 may be positioned immediately adjacent one another. Further alternately, the motor sub-units may partially overlap.

Referring again to the example of FIGS. 6 and 7, four motor sub-units 150A, 150B, 150C, and 150D are illustrated. As shown, the second motor sub-unit 150B is axially spaced along the motor axis 142 from the first motor sub-unit 150A; the third motor sub-unit 150C is axially spaced along the motor axis 142 from the first motor sub-unit 150A and the second motor sub-unit 150B; and the fourth motor sub-unit 150D is axially spaced along the motor axis 142 from the first motor sub-unit 150A, the second motor sub-unit 150B and the third motor sub-unit 150C. Furthermore, the first motor sub-unit 150A, the second motor sub-unit 150B, the third motor sub-unit 150C, and the fourth motor sub-unit 150D are arranged linearly.

Although four motor sub-units 150 are shown in the example of FIGS. 6 and 7 respectively, it should be appreciated that the brush motor 140 may include a greater or lesser number of motor sub-units 150 in various implementations. In general, brush motor 140 includes at least two motor sub-units 150 and optionally, three, four, five, six, seven or more motor sub-units 150.

As shown in FIGS. 6 and 7, each motor sub-unit 150 includes a rotor portion 160 and a stator portion 170. Each rotor portion 160 is rotatable (relative to the corresponding stator portion 170) about the motor axis 142. Each stator portion 170 may be non-rotationally fixed with respect to the corresponding rotor portion 160. For instance, each stator portion 170 may be non-rotationally fixed relative to the motor axis 142.

Each rotor portion 160 can be configured to generate a rotor magnetic field. Similarly, each stator portion 170 can be configured to generate a stator magnetic field. The stator magnetic field and rotor magnetic field of the respective stator and rotor portions can be configured to attract and repel one another in order to drive rotation of the rotor portions 160 relative to the stator portions 170.

As noted, the stator portion 170 can be rotationally stationary relative to the corresponding rotor portion 160. Accordingly, they need not be fixed in position but may also be rotatable. For example, each of the stator portions 170 can be fixed to a support structure (e.g., motor housing 146) usable to secure the stator portion 170 in a fixed position. In the illustrated example, the stator portions 170 are fixedly secure to the surface cleaning head 110 via motor housing 146 and a head connector 134 (see e.g., FIGS. 3 and 6).

Figure 8:
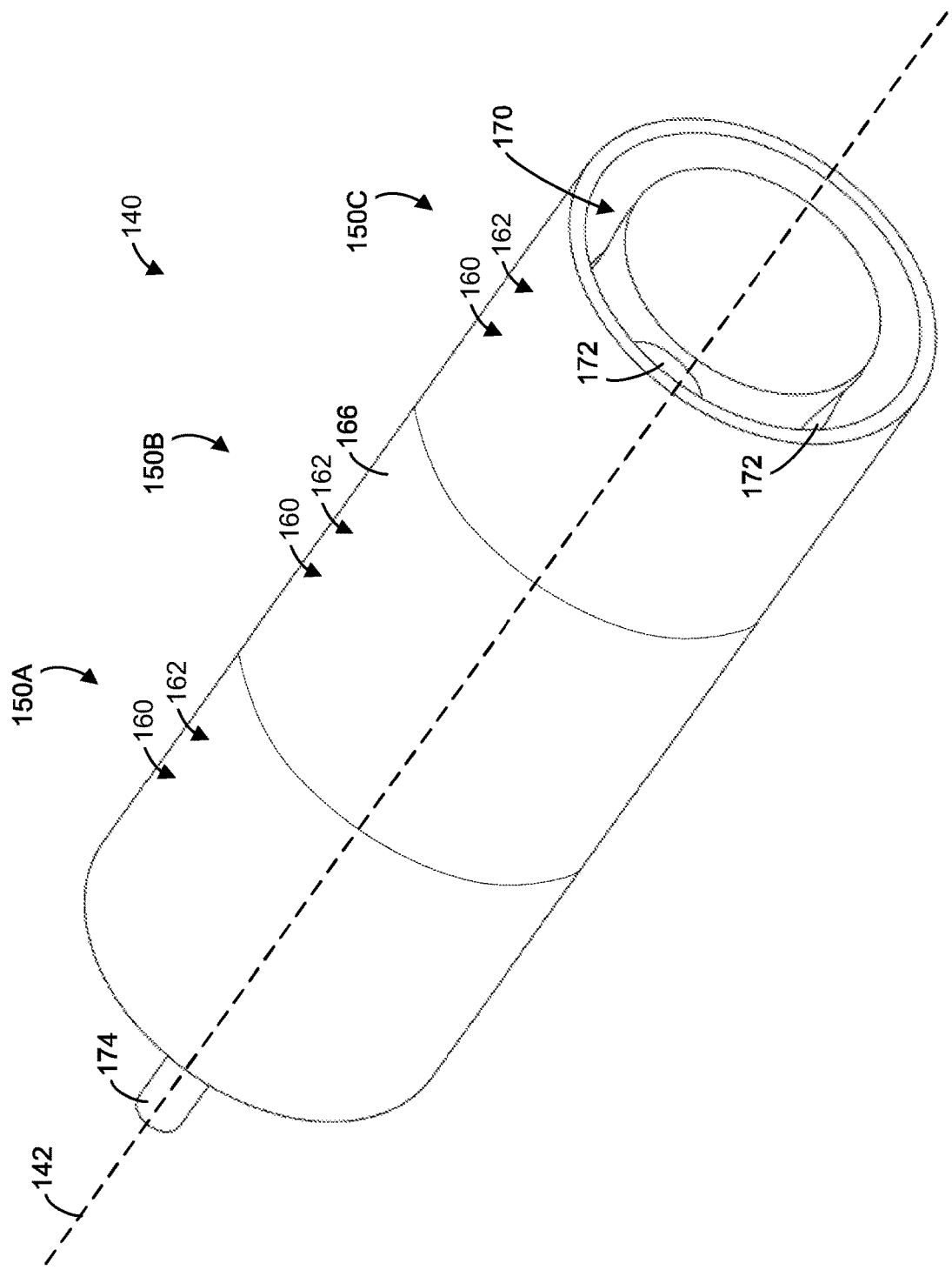
FIG. 8 is perspective view of another example brush motor usable with the surface cleaning head shown in FIG. 3.
Figure 9:
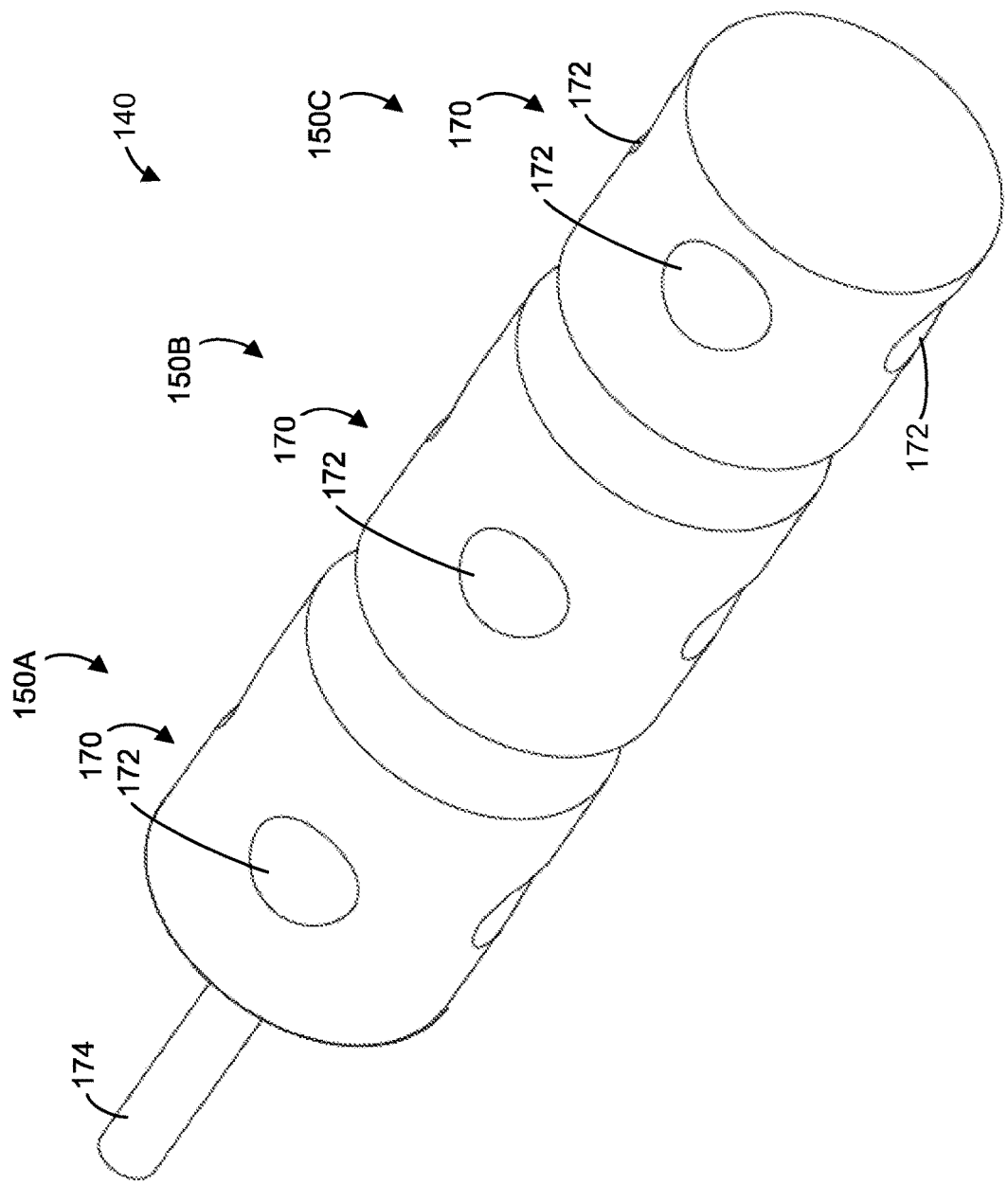
FIG. 9 is a perspective view of the brush motor shown in FIG. 8, with the rotor portions omitted.

Alternately, the stator portions 170 may be coupled to an alternate support structure. For example, a stator support shaft 174 is shown in the example of FIGS. 8 and 9. The stator shaft 174 can be fixed to the surface cleaning head 110 via a head connector 134.

Each rotor portion 160 may be generally concentric with the corresponding stator portion 170. Referring again to FIGS. 6 and 7, each rotor portion 160 can be at least partially surrounded by a corresponding stator portion 170. In this configuration, the brush motor 140 may be referred to as an "inrunner" because the rotor portions 160 are generally positioned inside of the stator portions 170.

Alternately, the brush motor 140 may be arranged in an "outrunner" configuration in which the stator portions 170 are generally positioned inside of the rotor portions 160. For example, FIGS. 8 and 9 show an example of a brush motor 140 arranged in an outrunner configuration. As shown in the example of FIGS. 8 and 9, each stator portion 170 is at least partially surrounded by a rotor portion 160. That is, the stator portions 170 are generally positioned inside of the rotor portions 160.

In the illustrated outrunner example, each rotor portion 160 is formed as a portion of a rotating shell 166. The rotating shell 166 can be coupled (directly or indirectly) to the rotatable output member to drive rotation of the rotatable output member. Accordingly, in the outrunner configuration, the brush motor 140 may omit a central drive shaft.

The brush motor 140 can be drivingly connected to the brushing member 120 in various ways. In examples described herein, each motor sub-unit 150 can be drivingly connected to the brushing member 120 (directly or indirectly). Each motor sub-unit 150 can also be drivingly connected to another motor sub-unit 150. Accordingly, an output shaft of one sub-unit 150 and/or the outer shell of one sub-unit 150 may be drivingly connected to the brushing member 120. In this manner, the plurality of motor sub-units 150 can cooperatively drive the rotation of the brushing member 120.

In general, each of the rotor portions 160 are drivingly connected to the rotatable brushing member 120 (directly or indirectly). Accordingly, rotation of the rotor portions 160 can drive rotation of the brushing member 120. In the example of FIGS. 6 and 7, a central drive shaft 144 extends through the motor sub-units 150A-D. The first motor sub-unit 150A, second motor sub-unit 150B, third motor sub-unit 150C, and fourth motor sub-unit 150D are each mounted to the central drive shaft 144.

The drive shaft 144 is coupled to each of the rotor portions 160. The drive shaft 144 is also drivingly connected to the brushing member 120, in this case using a brush connector 132 (see e.g., FIG. 6). Accordingly, rotation of the rotor portions 160 can drive rotation of the drive shaft 144 which can, in turn, drive rotation of the brushing member 120 (via drive coupling connector 132).

The rotor portions 160 may also be coupled to each other and to the brushing member 120 in other ways. For instance, in the outrunner example of FIGS. 8 and 9, the rotor portions 160 can drive rotation of the brushing member 120 more directly. For example, the rotating shell 166 can act as a drive member that is coupled to the brushing member 120 (e.g., using a drive coupling). Rotation of the shell 166 can thus drive rotation of the brushing member 120.

Alternately, the rotating shell 166 may be directly connected to the brushing member 120. For example, the rotating shell 166 may be non-rotatably secured to the inner surface of the brushing member, such as by a mechanical fastener (e.g., a screw), a locking fit or the like. Accordingly, an outer surface of the rotating shell 166 may abut the inner surface of the brushing member 120. The outer surface of the rotating shell 166 may engage the inner surface of the brushing member 120 (e.g., through a frictional engagement or mating engagement members) such that rotation of the shell 166 can directly drive rotation of the brushing member 120 through the frictional engagement. For example, as shown in FIG. 17, the rotating shell 166 may be integrated with a motor housing 146. The outer surface 141 of motor housing 146 can engage the inner surface 143 of the brushing member 120 as shown. Accordingly, rotation of the rotor portions 160 (provided as part of shell 166 and thus motor housing 146) can drive rotation of the brushing member 120 directly.

As shown in FIG. 7, each rotor portion 160 can include one or more rotor magnetic elements 162 that generate the rotor magnetic fields. Each stator portion 170 can include one or more stator magnetic elements 172 that generate the stator magnetic fields. Field coils (i.e., electromagnets that generate a magnetic field when electric current is driven therethrough) can be used to provide one of the rotor magnetic elements 162 and the stator magnetic elements 172. Permanent magnets may be used to provide the other of the rotor magnetic elements 162 and the stator magnetic elements 172.

The brush motor 140 includes a plurality of field coils. Each motor sub-unit 150 includes at least one of the field coils and generally includes a plurality of field coils. Each field coil is coupled to either a rotor portion 160 (thereby providing a rotor magnetic element 162) or a stator portion 170 (thereby providing stator magnetic elements 172) of the corresponding motor sub-unit 150. The other of the rotor portion 160 and stator portion 170 can include magnetic elements in the form of permanent magnets. When electrical current is driven through the field coils a magnetic field is generated. The coil magnetic field can interact with the magnetic field generated by the permanent magnets positioned on the other of the rotor and the stator portions, to drive rotation of the rotor portions 160. Depending on the direction of the current through the field coils (and the corresponding magnetic field generated) as well as the rotational position of the rotor portions, the respective magnetic fields of the stator and rotor can attract or repel one another in order to drive rotation of the rotor portions 160. A motor controller (not shown) can drive the electrical current through the plurality of field coils in order to provide the desired motoring operation.

Typically, each of the rotor magnetic elements 162 can be provided using permanent magnets, and each of the stator magnetic elements 172 are field coils. This may simplify the electrical connections required to energize and control the field coils. The stator portions 170 may include coil formers or poles (not shown) about which the field coils can be wound.

Alternately, each of the rotor magnetic elements 162 may be provided using field coils and each of the stator magnetic elements 172 may be provided using permanent magnets.

As shown, the rotor portions 160 can include coil formers 164 on which the field coils can be wound. Accordingly, field coils (not shown) can be wound around the coil formers 164 to provide the rotor magnetic elements 162 for each motor sub-unit 150. The stator magnetic elements 172 can thus be provided by permanent magnets.

In an outrunner configuration, as shown in FIGS. 8 and 9, the rotor magnetic elements 162 can be integrated into or fixed to the rotating shell 166. In some embodiments, the brush motor 140 may not include a rotating shell 166. For example, the rotor magnetic elements 162 may be integrated into or directly fixed to the brushing member 120.

Referring again to the example of FIG. 7, the magnetic elements of each motor sub-unit 150 may be angularly aligned in a circumferential direction about the motor axis 142. That is, the rotor magnetic elements 162 of each motor sub-unit 150 (in this example, field coils) can be aligned with the rotor magnetic elements 162 of each other motor sub-unit 150. In the illustrated example, the rotor magnetic element 162 for each motor sub-unit 150 is provided by a field coil, and so each field coil is also angularly aligned with each other field coil in the circumferential direction about the motor axis 142. Likewise, the stator magnetic elements 172 of each motor sub-unit 150 (in this example, permanent magnets) are similarly aligned with the stator magnetic elements 172 of each other motor sub-unit 150.

The stator magnetic elements 172 can be evenly distributed around the stator portion. In this example, with four stator magnetic elements 172 per motor sub-unit 150, each motor sub-unit 150 includes a stator magnetic element 172 positioned at 0°, 90°, 180°, and 270°. Different numbers of stator magnetic elements may be provided in different embodiments and the intervals between adjacent stator magnetic elements in a stator portion can vary accordingly. It will be appreciated that the rotors and/or stators may be provided at any angular position known in the art.

The rotor magnetic elements 162 may be similarly distributed around the circumference of the rotor portions at even intervals. With four rotor magnetic elements 162 per motor sub-unit 150, each motor sub-unit 150 includes rotor magnetic elements 162 spaced apart at 90° intervals. Different numbers of rotor magnetic elements may be provided in different embodiments and the intervals between adjacent rotor magnetic elements in a rotor portion can vary accordingly.

In other embodiments, the magnetic elements of the motor sub-units can be angularly spaced apart or offset in a circumferential direction about the motor axis 142. For example, the rotor magnetic elements 162 of each motor sub-unit 150 can be angularly offset from the rotor magnetic elements 162 of at least one other motor sub-unit. In some cases, the rotor magnetic elements 162 of each motor sub-unit 150 can be angularly offset from the rotor magnetic elements 162 of each other motor sub-unit 150.

The angular offset between magnetic elements in the motor sub-units 150 may vary depending on the number of motor sub-units and the intervals between the magnetic elements in each motor sub-unit. For example, where four motor sub-units 150 are provided with magnetic elements angularly spaced at 90° intervals, each motor sub-unit 150 may be provided with an offset of 22.5° relative to the nearest (in terms of angular spacing of magnetic elements) motor sub-unit 150. That is, a first motor sub-unit 150 may include rotor magnetic elements 162 angularly positioned at 0°, 90°, 180°, and 270°; a second motor sub-unit 150 may include rotor magnetic elements 162 angularly positioned at 22.5°, 112.5°, 202.5°, and 292.5°; a third motor sub-unit 150 may include rotor magnetic elements 162 angularly positioned at 45°, 135°, 225°, and 315°; and a fourth motor sub-unit 150 may include rotor magnetic elements 162 positioned at 67.5°, 157.5°, 247.5°, and 337.5°. As another example, where three motor sub-units 150 are provided with magnetic elements angularly spaced at 90° intervals, each motor sub-unit 150 may be provided with an offset of 30° relative to the nearest (in terms of angular spacing of magnetic elements) motor sub-unit 150.

Although the angular spacing between magnetic elements is described in relation to rotor magnetic elements 162, it should be understood that the stator magnetic elements 172 of each motor sub-unit 150 may be angularly offset from the stator magnetic elements 172 of one or more other motor sub-unit 150.

An advantage of this configuration is that the motor sub-units may generate torque at different rotational positions. Accordingly, electric current can be selectively directed to the field coils of different motor sub-units based on the rotational position of the rotor portions 160 to smooth the torque produced by the brush motor 140. For example, where the motor sub-units 150 are provided with field coils offset by 22.5°, the motor controller may direct current to a first field coil when the rotational position is 0° to 22.5°, a second field coil when the rotational position is 22.5° to 45°, a third field coil when the rotational position is 45° to 67.5°, a fourth field coil when the rotational position is 67.5° to 90°, etc. By applying electric current to different field coils at different the rotational positions, torque can be generated at each rotational position, resulting in an overall smoother or more consistent torque across the rotational positions (see e.g., FIG. 16).

The arrangement of the brush motor 140 may facilitate a reduced size for a household appliance by allowing the brush motor 140 and the brushing member 120 to be positioned relative to each other in various configurations.

For example, the brush motor 140 can positioned inside the brushing member 120 (see e.g., FIGS. 3, 5, 6, 10-12 and 17). The brushing member 120 can include an internal member cavity 129 (see e.g., FIG. 3). Internal member cavity 129 can define an inner member volume surrounded by the brushing member 120. The brush motor 140 can be disposed within this inner member volume. The brush motor may occupy a portion or a majority of cavity 129 (e.g., 40%, 50%, 60%, 70%, 80%, 90% or more). The bush motor may have a length with is, e.g., 40%, 50%, 60%, 70%, 80%, 90% or more of the axial length of the brushing member 120 and/or may occupy 40%, 50%, 60%, 70%, 80%, 90% or more of the cross-sectional area of the cavity 129 (in a direction transverse to axis 122).

An advantage of this configuration is that the brush motor 140 does not occupy additional space within the surface cleaning apparatus 100. This may allow the size of surface cleaning apparatus 100 to be reduced or permit additional components to be installed within the surface cleaning apparatus 100.

Alternately, the brush motor 140 may be external to the brushing member 120. For example, the brush motor 140 and the brushing member 120 may be arranged in a parallel or side-by-side arrangement. In such arrangement, the brush motor 140 and the brushing member 120 may be drivingly connected using various coupling elements such as a drive belt, or other suitable coupling.

Figure 3:
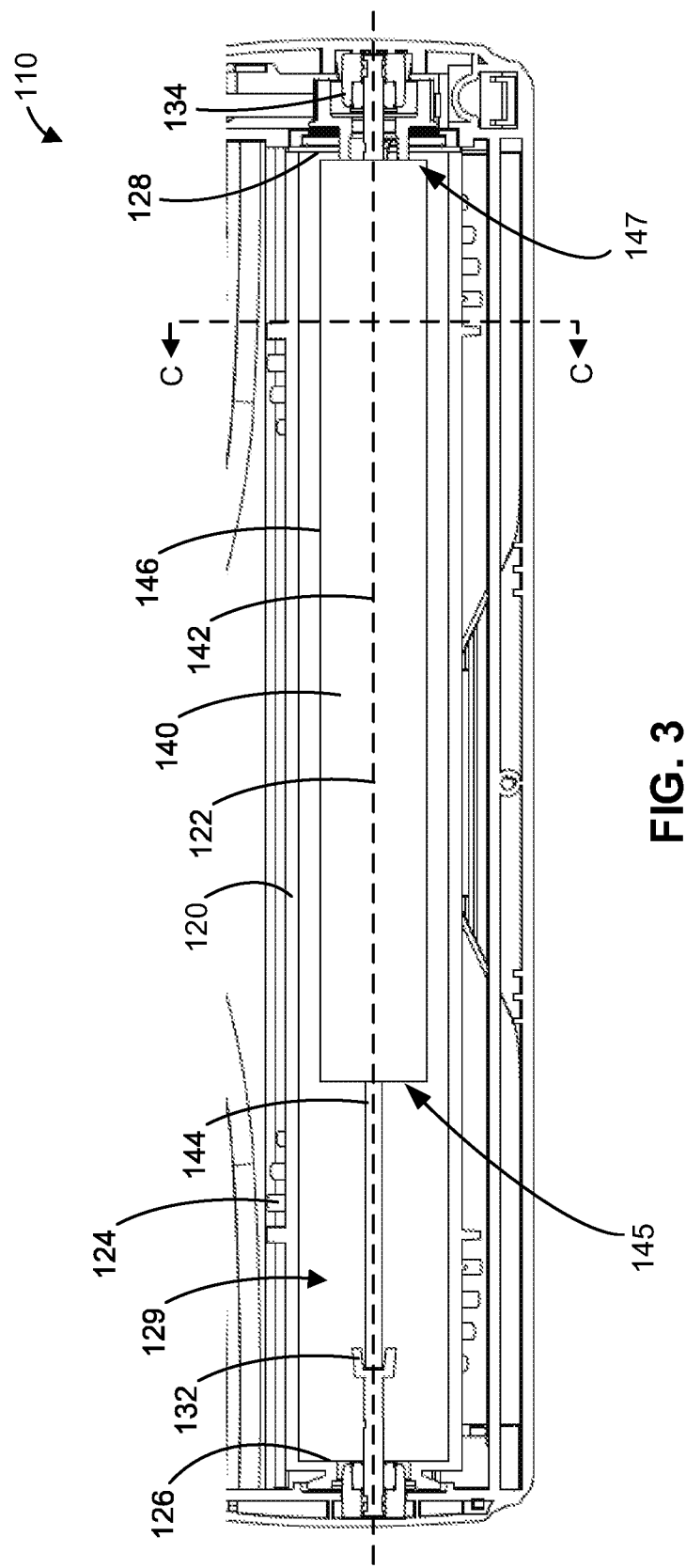
FIG. 3 is a partial section view of the surface cleaning head of the surface cleaning apparatus shown in FIG. 1 taken along line A-A in FIG. 1.
Figure 4:
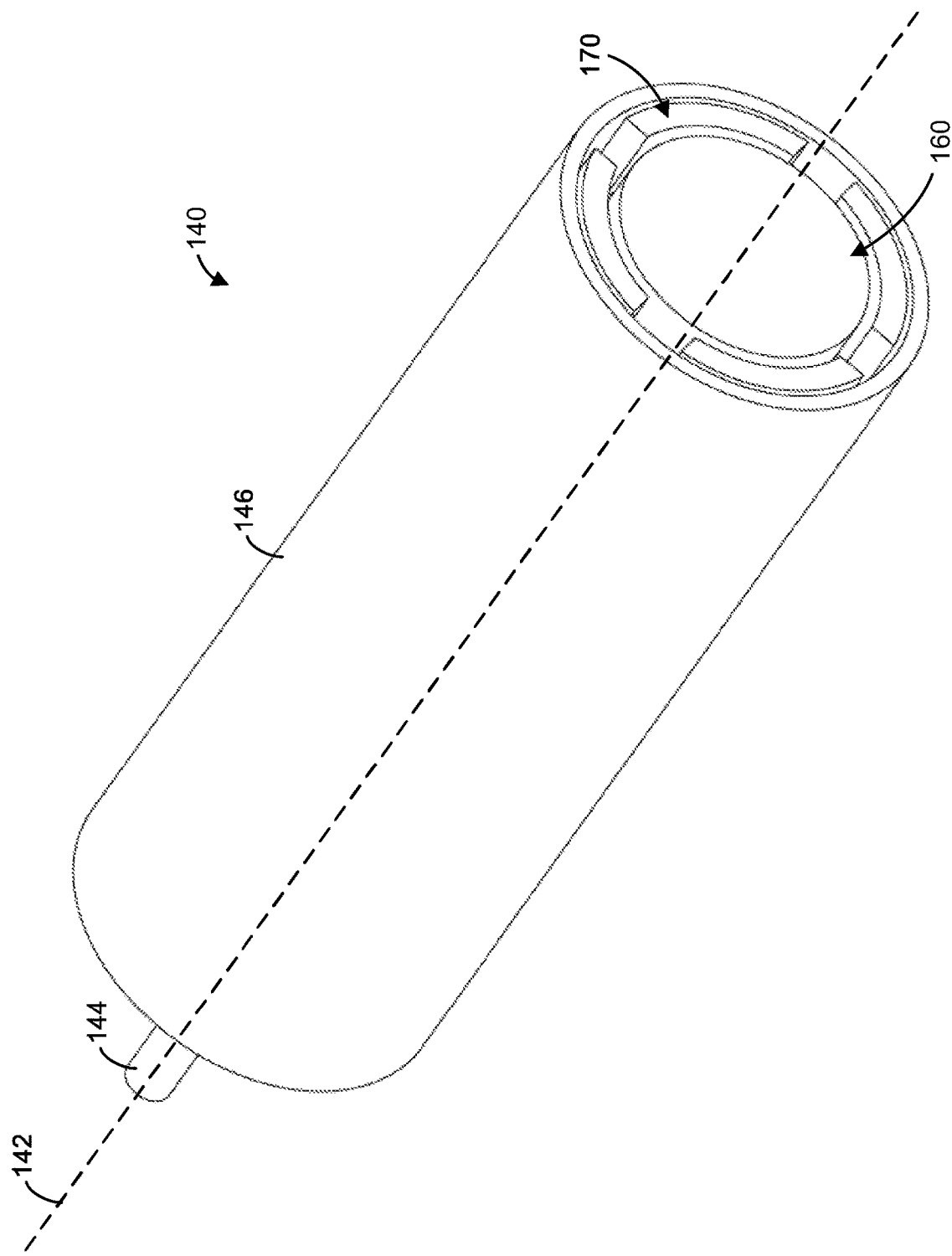
FIG. 4 is a perspective view of the brush motor of the surface cleaning head shown in FIG. 3.
Figure 5:
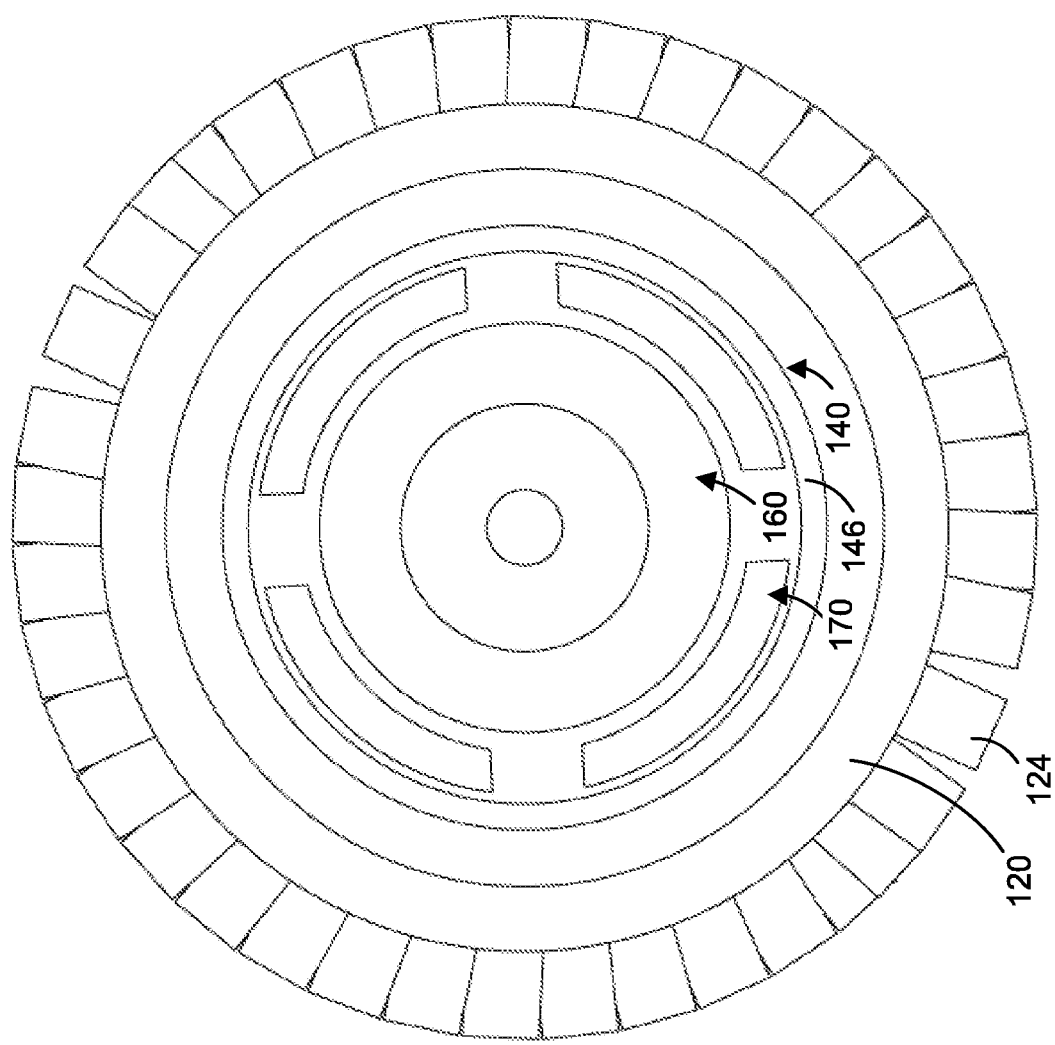
FIG. 5 is a side sectional view of the brushing member and brush motor of the surface cleaning head shown in FIG. 3 taken along line C-C in FIG. 3.

As shown in FIG. 3, the brushing member 120 can extend longitudinally between a first end 126 and a second opposed end 128. A brush member axis 122 can extend longitudinally between the first and second opposed ends 126 and 128 of the brushing member 120. The brush member axis 122 may be defined as the rotational axis of brushing member 120. As illustrated in FIGS. 3 and 5, motor axis 142 and the brush member axis 122 can be colinear. Alternately, the brush member axis 122 and the motor axis 142 may be parallel (e.g., where the brush motor 140 is disposed outside the brushing member 120).

As shown in FIG. 3, the brush motor 140 and brushing member 120 can both be disposed within a housing of the surface cleaning head 110. In the illustrated example, the brush motor 140 is non-rotationally mounted to the surface cleaning head 110 via the head connector 134. In this manner, the brush motor 140 can drive the brushing member 120 to rotate relative to the fixed portion of the brush motor 140 and the surface cleaning head 110.

However, it will be appreciated that the brush motor 140 and the brushing member 120 may be positioned in various locations of a surface cleaning apparatus 100.

The brush motor 140 can be contained within a housing 146. The housing can enclose various internal components of the brush motor 140. The housing 146 can protect the interior components and allow for easier handling of the brush motor 140. In such a case, the housing 140 may itself be drivingly connected to the brush member, such as by a friction fit as discussed previously.

In some cases, one or more of the interior components may be supported by or mounted to the housing 146. For example, the housing 146 may support the stator portions in fixed relation to an appliance. However, it should be appreciated that a separate housing may be omitted in some examples, such as the motor shown in FIGS. 8 and 9.

The brush motor 140 may be configured to be used with rotatable output members of various dimensions. The configuration of the motor sub-units 150 may be particularly advantageous for motors used in appliances having longitudinally extending sections or longitudinally extending output members.

As shown in FIG. 3, the plurality of motor sub-units 150 may extend between a first motor unit end 145 and a second motor unit end 147. The longitudinal distance between the first motor unit end 145 and the second motor unit end 147 can define the longitudinal length of the brush motor 140. Although a drive coupling such as drive shaft 144 may extend beyond the longitudinal length of the brush motor 140, it should be understood that the longitudinal length of the brush motor 140 described herein generally relates to the longitudinal distance required to house the motoring components of the plurality of motor sub-units 150.

In some examples, the brush motor 140 may have a longitudinal length of from about 3 inches to about 20 inches, or any length therebetween, such as 4, 5, 6, 7, 8, 9, 10, 11, 12, 13, 14, 15, 16, 17, 18 or 19 inches. The brush motor 140 may have a length that is comparable to the length of a brushing member 120 in a full sized surface cleaning head, wherein the longitudinal length of the brushing member 120 can be defined as the longitudinal distance between the first and second opposed ends 126 and 128. Accordingly, the brush motor 140 may have a length that is, e.g., from about 9- to about 20 inches, from about 9- to about 18 inches, from about 12- to about 18 inches or from about 10- to about 15 inches. Alternately the brush motor 140 may have a length that is comparable to the length of a brushing member 120 in a compact above floor surface cleaning head, e.g., from about 2- to about 8, from about 3- to about 8, from about 3- to about 6 inches.

The brush motor 140 may have a longitudinal length less than the length of the brushing member 120. However, as discussed previously, the brush motor 140 may extend along a majority of the longitudinal length of the brushing member 120. This may help distribute the heat generation along the length of brushing member 120 (which may promote greater heat dissipation). For example, brush motor 140 may have a longitudinal length of at least 50% the longitudinal length of the brushing member 120. In some example, the brush motor 140 may have a longitudinal length of at least 75% of the longitudinal length of the brushing member 120.

Figure 10:
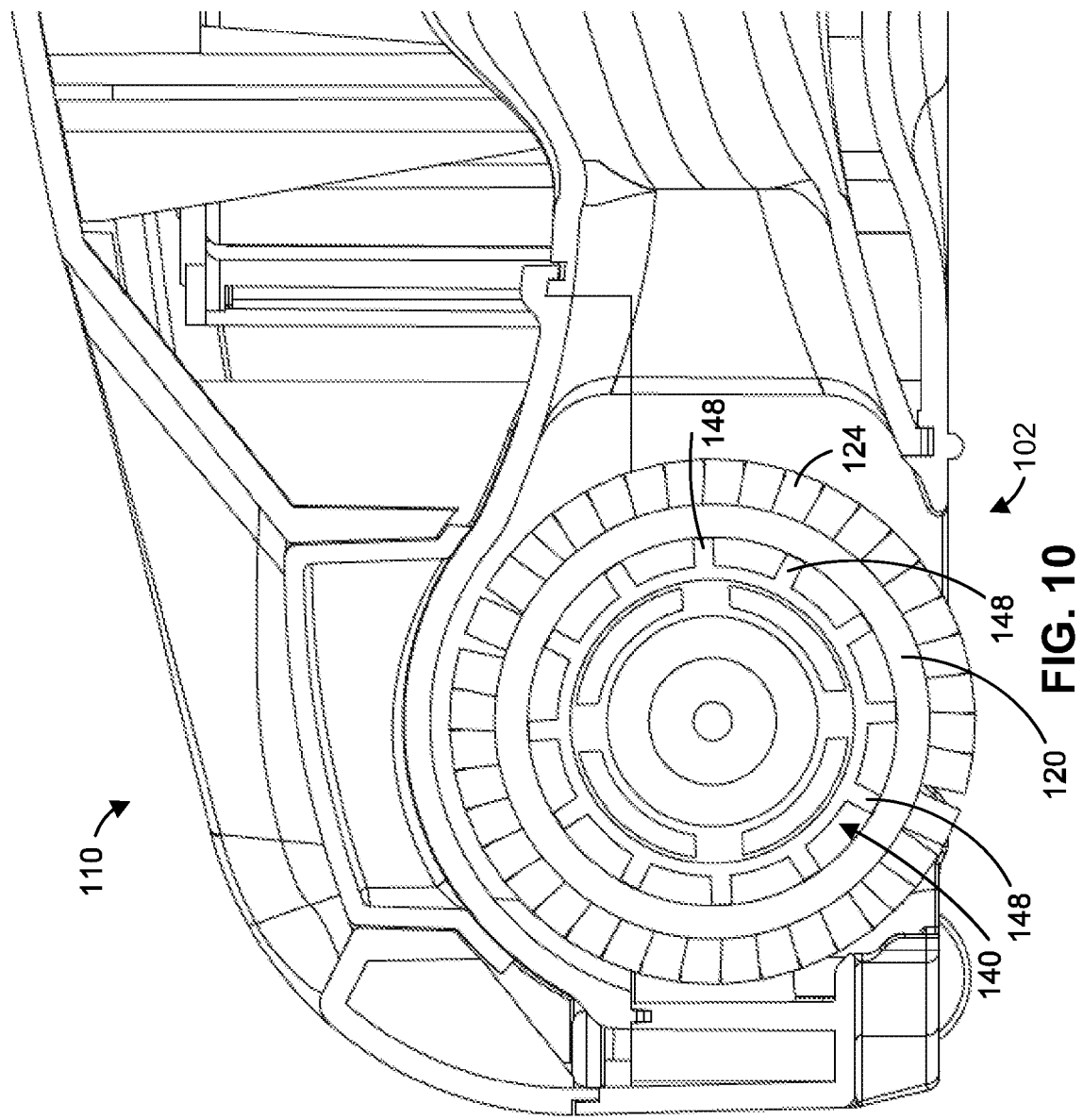
FIG. 10 is a side sectional view of another example surface cleaning head useable with the surface cleaning apparatus shown in FIG. 1 taken along line B-B in FIG. 1 showing an example of thermally conductive flaps for the brush motor.

In some examples, the brush motor 140 and/or brushing member 120 may also include various heat dissipation members. For example, FIG. 10 shows an example brush motor 140 coupled to a plurality of heat dissipation members in the form of flaps 148. Flaps 148 can be thermally coupled to the brush motor 140 to promote heat transfer between the brush motor 140 and the brushing member 120. Flaps 148 can extend radially outward from the brush motor 140 to the inner surface of the brushing member 120. The flaps 140 may be attached to one or both of the brush motor 140 and the brushing member 120. Any means known in the art may be used to secure the flaps 148 in position. It will be appreciated that the flaps 148 may be used to secure brush motor 140 in position in brushing member 120. For example, the flaps 148 may be secured to, e.g., the inner surface of the brushing member 120 and also the brush motor 140.

Figure 11:
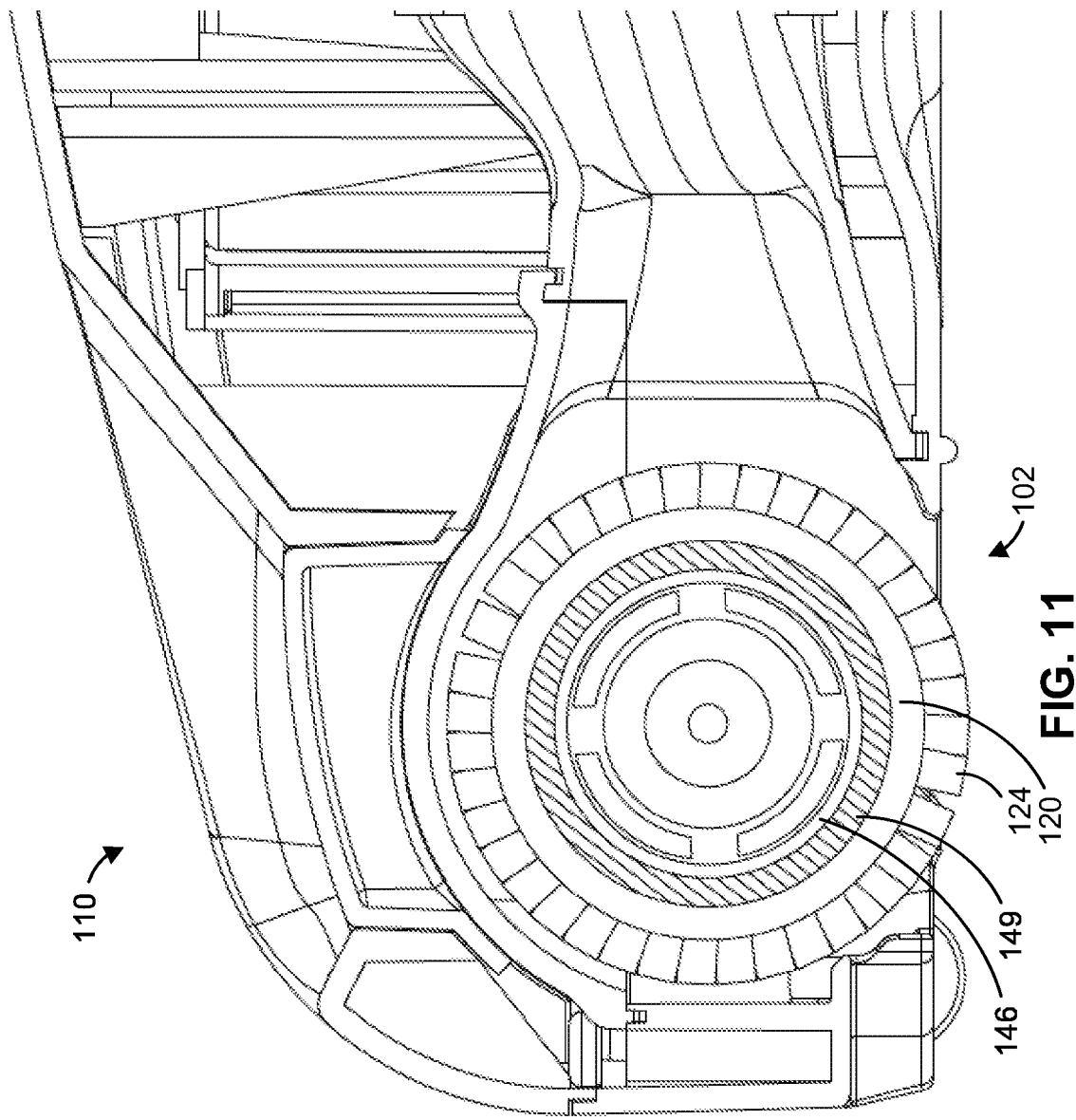
FIG. 11 is a side sectional view of another example surface cleaning head useable with the surface cleaning apparatus shown in FIG. 1 taken along line B-B in FIG. 1 showing an example thermally conductive fill for the brush motor.

FIG. 11 shows another example brush motor 140 coupled to heat dissipation members in the form of thermally conductive fill 149. As shown, the thermally conductive fill 149 is enclosed within the inner volume of the brushing member 120. The thermally conductive fill 149 can promote heat transfer between the brush motor 140 and the brushing member 120. The thermally conductive fill 149 can be any suitable material for conducting heat, including, for example, carbon, metal, and the like. It will be appreciated that the fill 149 may be used to secure brush motor 140 in position in brushing member 120.

In some embodiments, additional components can be stored within the brushing member 120, in addition to the brushing motor 140. For example, energy storage members for brushing motor 140 (and/or other components of household appliance) may be contained within the brushing member 120. Alternately or in addition, control components for brushing motor 140 (and/or other components of household appliance) may be contained within the brushing member 120.

Figure 12:
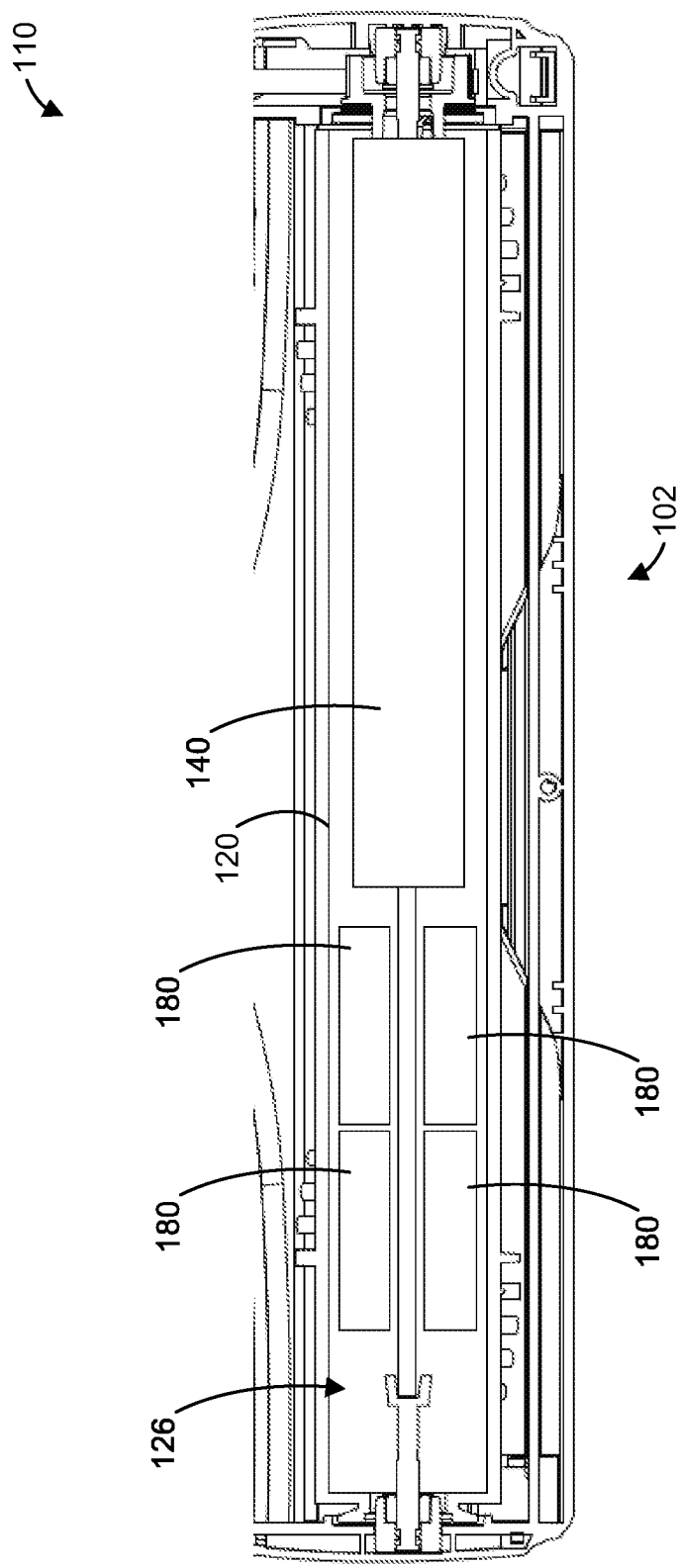
FIG. 12 is a sectional view of another example surface cleaning head useable with the surface cleaning apparatus shown in FIG. 1 taken along line A-A in FIG. 1 showing an example of energy storage members housed within the brushing member.

FIG. 12 shows a plurality of energy storage members in the form of battery packs 180. As shown, the battery packs 180 are disposed within the inner volume of the brushing member 120 (in addition to the brush motor 140). In some examples, the battery packs 180 may be permanently fixed within brushing member 120 and rechargeable in-situ. Alternately, the battery packs 180 may be removable from the brushing member 120. Although four battery packs 180 are shown in the illustrated example, it should be appreciated that there can greater or fewer battery packs 180 may be used. Further, each battery pack 180 may be a single battery (without a battery pack housing) or a plurality of batteries provided in a housing).

Energy storage members 180 can be used to supply power to the brush motor 140. Alternately or in addition, energy storage members 180 may supply power to other electrical components of the surface cleaning apparatus 100, such as head lights for the surface cleaning head. An advantage of this configuration is that the battery packs 180 do not occupy additional space within the surface cleaning apparatus 100. This may allow for additional components to be disposed within the surface cleaning head 110 or may allow the size of surface cleaning head 110 to be reduced.

Figure 13:
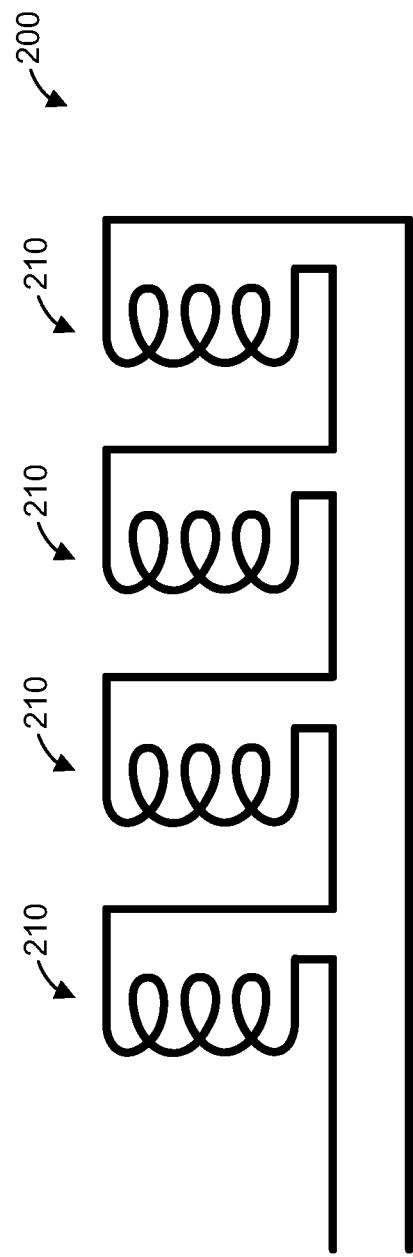
FIG. 13 is a schematic diagram of an example control circuit for a brush motor.
Figure 14:
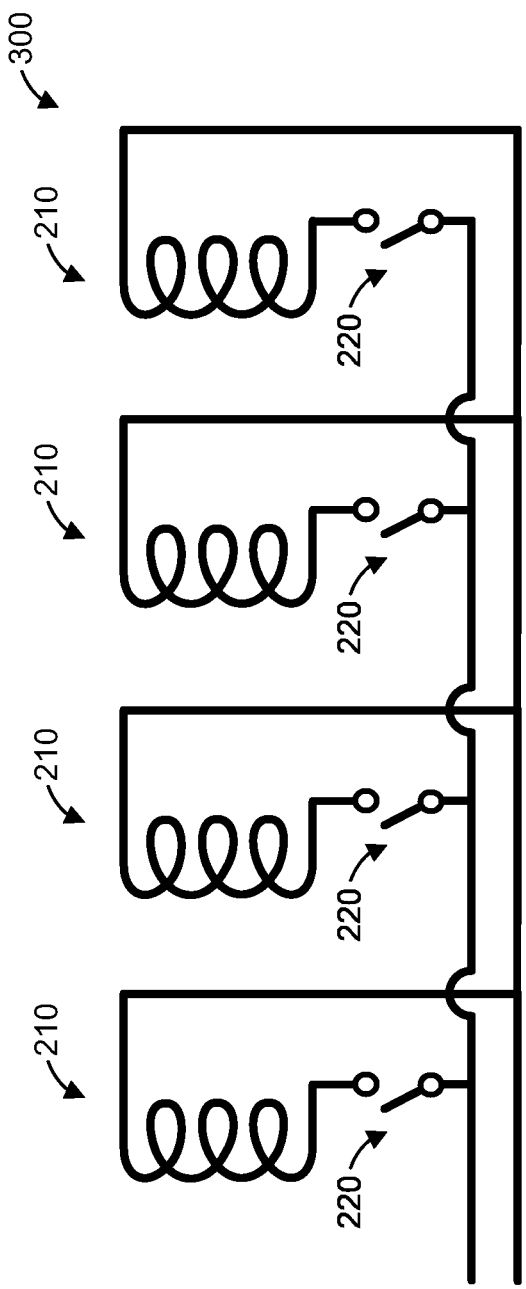
FIG. 14 is a schematic diagram of another example control circuit for a brush motor.

Referring now to FIGS. 13 and 14, shown therein are example motor control circuits 200 and 300. The motor control circuits 200 and 300 are example implementations of switching circuits that may be used with a motor controller (not shown) for the brush motors described herein. The motor controller can be implemented using various electronic control components, such as a such as a general-purpose microprocessor, field programmable gate array, application specific integrated circuit, microcontroller, or other suitable controller.

In general, the motor controller can be used to control the flow of current through the field coils of the motor sub-units 150. The motor controller can direct electric current through the plurality of field coils 210 to drive rotation of the rotor portions 160. Motor controller can also be configured to monitor the operation of the various motor sub-units 150, including determining the position of the various rotor portions. The motor controller can receive electrical power from various power sources, including, for example, the energy storage members 180, or an electrical cable (not shown) that can be electrically connected to mains power at a standard wall electrical outlet.

In some embodiments, the motor controller can direct electric current to each of the field coils 210 simultaneously. For example, as shown in FIG. 13, each field coil 210 can be connected in series so that each field coil 210 receives power simultaneously. This may be useful for brush motors in which each field coil 210 is angularly aligned with each other field coil 210 in a circumferential direction about the motor axis 142.

Figure 15:
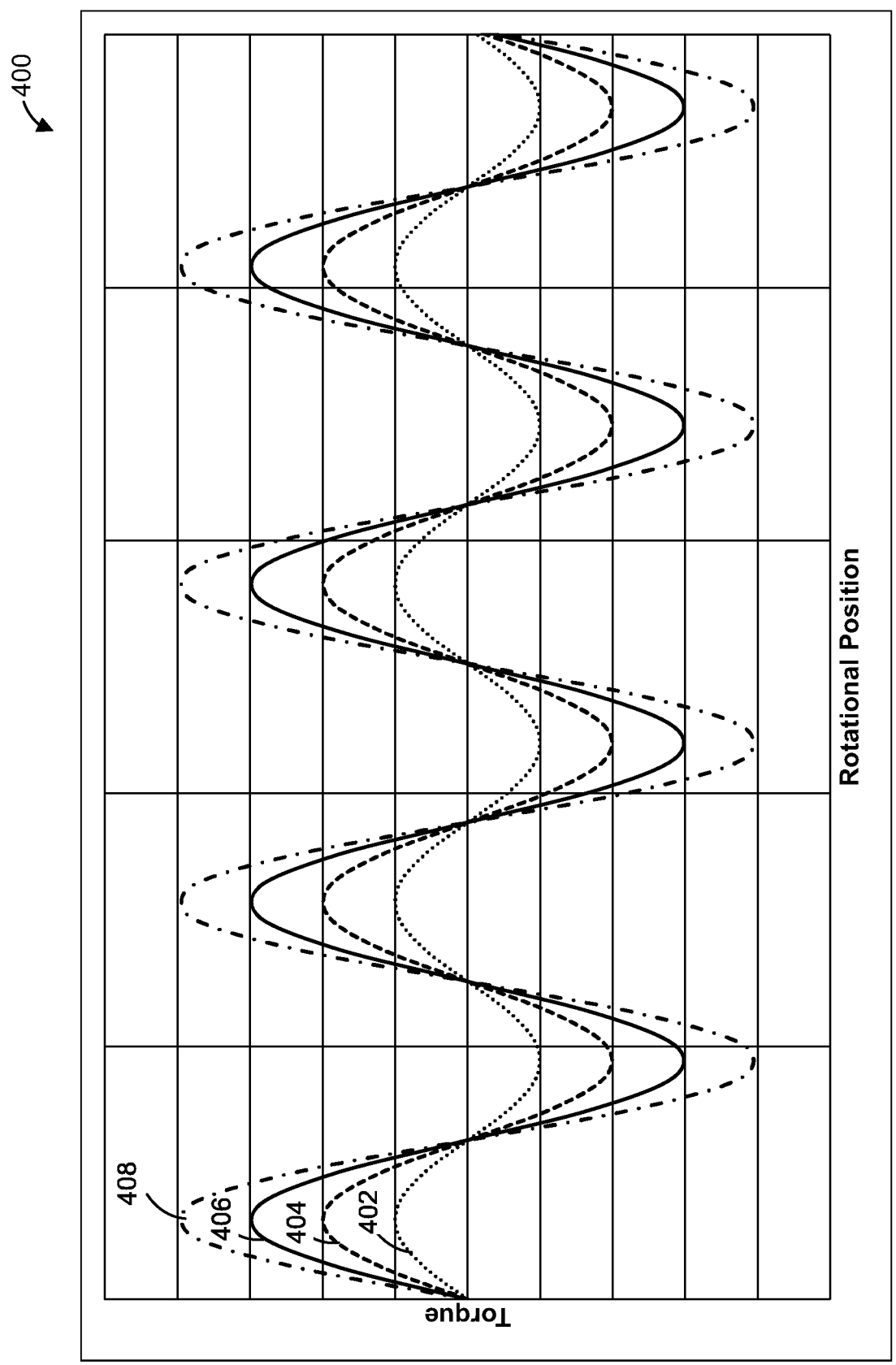
FIG. 15 is a graph illustrating example torque and rotational position data for a brush motor during operation.

An example of the torque generated by field coils 210 receiving electric current simultaneously is illustrated in graph 400 shown in FIG. 15. In the illustrated example, each field coil 210 is angularly aligned with each other field coil 210 in a circumferential direction about the motor axis 142. Graph 400 illustrates the torque versus rotational position for a single field coil 210 in data series 402, two field coils 210 in data series 404, three field coils 210 in data series 406, and four field coils 210 in data series 408. As shown, the maximum torque can be increased by adding additional field coils 210. However, in this configuration there are rotational positions where minimal torque is generated.

Alternately, the motor controller can be configured to selectively direct electric current to each of the field coils 210 individually. For example, as shown in FIG. 13, each field coil 210 can be connected in parallel. The field coils may be selectively powered using the switches 220. The switches 220 can be any suitable switches for connecting or disconnecting the field coils 210, including, for example, field effect transistors (FET), insulated-gate bipolar transistors (IGBT), and the like.

The motor controller can be configured to selectively direct electric current to each of the field coils 210 based on the angular position of the rotor portions 160. When each field coil 210 is angularly spaced apart from each other field coil 210 in the circumferential direction about the motor axis 142, the motor controller can direct the electric current based on the rotational position of the rotor portions 160 to smooth the generated torque.

Figure 16:
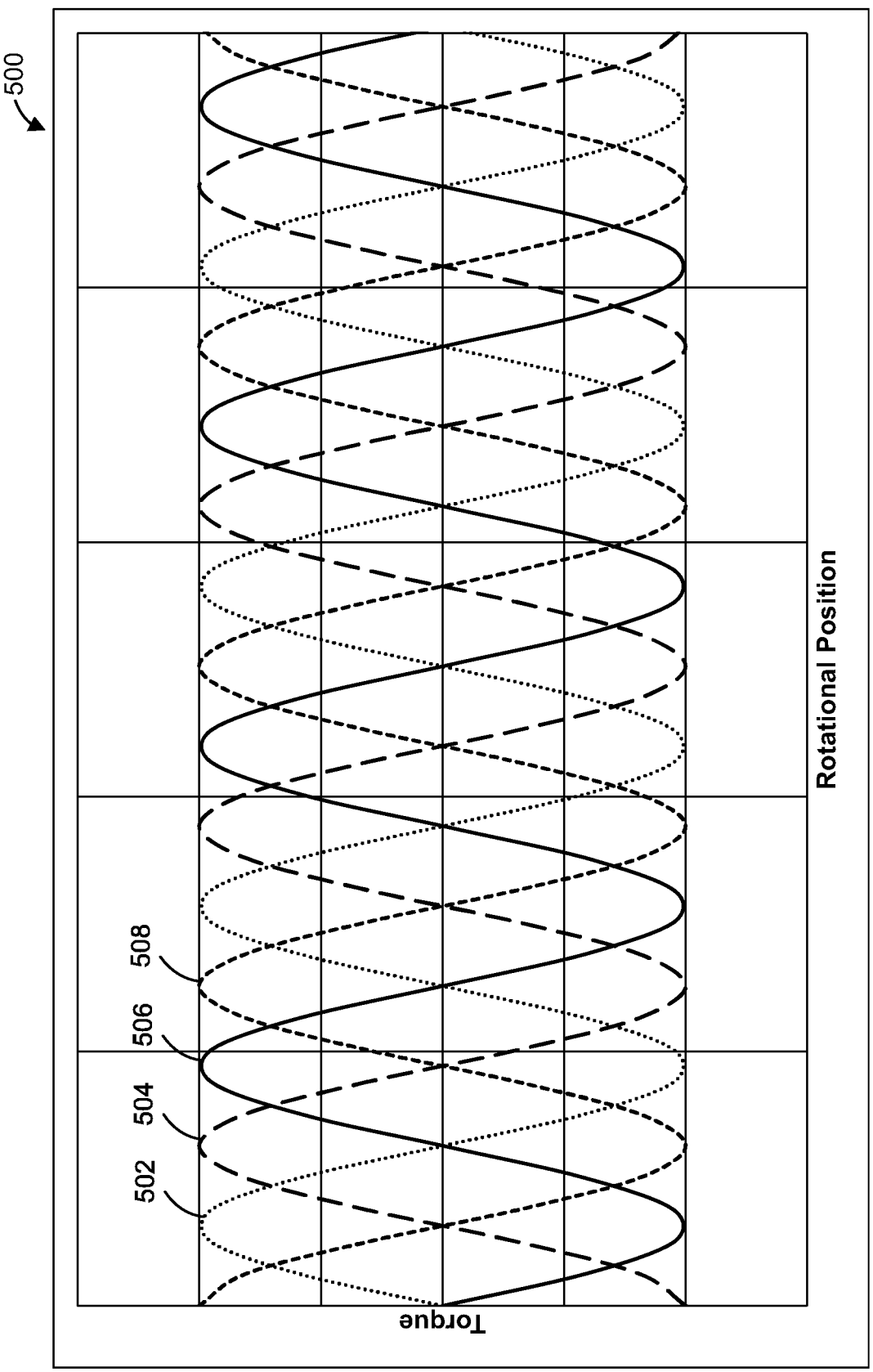
FIG. 16 is a graph illustrating example torque and rotational position data for a brush motor during operation; and, FIG. 17 is a side sectional view of another example surface cleaning head useable with the surface cleaning apparatus shown in FIG. 1 taken along line B-B in FIG. 1.

An example of the torque generated by field coils 210 receiving electric current based on the angular position of the rotor portions 160 is shown in FIG. 16. In the illustrated example, each field coil 210 is angularly spaced apart from each other field coil 210 in the circumferential direction about the motor axis 142. Graph 500 illustrates the torque versus rotational position for a first field coil 210 in data series 502, a second field coil 210 in data series 504, a third field coil 210 in data series 506, and a fourth field coil 210 in data series 508. As shown, the motor controller can selectively direct electric current to the field coils 210 to generate an overall torque that is more consistent (i.e., smoothed) across different rotational positions.

The motor controller can selectively direct electric current to each of the field coils 210 based on the angular position of the rotor portions 160 in various ways. In some embodiments, the brush motor may include a position sensor operable to detect the angular position of the rotor portions 160. The motor controller may actuate the switches 220 in response to position sensor readings.

In some embodiments, the motor controller may include reed switches that actuate in response to a magnetic field generated by magnetic elements disposed in the rotor portions 160. The reed switches can actuate in response to the change in position of the magnetic elements as the rotor portions 160 are rotated. In the illustrated example, the switches 220 may be reed switches.

In some embodiments, the motor controller may include one or more brushes. The brushes can be positioned to contact the rotor portions 160 at certain angular positions of the rotor portions 160 to selectively connect to the field coils 210 as the rotor portions 160 are rotated. In the illustrated example, the switches 220 may represent one or more brushes. It will be appreciated that any feature disclosed here may be used in a brushless motor.

In some embodiments, the motor controller may receive a frequency signal from an external frequency source. The frequency signal can correspond to the rotational speed of the rotor portions 160. The motor controller can selectively direct electric current to the field coils 210 based on the frequency signal. For example, the motor controller may actuate the switches 220 based on the frequency signal. The motor controller can cause the field coils 210 to receive the electric current at predetermined times associated with the frequency signal corresponding to presumed angular positions of the rotor portions 160.

In some embodiments, the motor controller may include delay elements, including, for example, capacitive components, inductive components, and the like. The delay elements can delay the flow of electric current to the field coils 210. The delay may correspond to the rotational speed of the rotor portions 160. For instance, in FIG. 13, delay elements can be disposed in between the field coils 210 connected in series. The delay elements can cause the field coils 210 to receive the electric current at predetermined times corresponding to the presumed angular positions of the rotor portions 160.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. A brush motor positionable inside a rotatable brushing member, the brush motor comprising:
 (a) a plurality of field coils;
 (b) a first motor sub-unit comprising a first rotor portion, a first stator portion, and a first field coil of the plurality of field coils, wherein the first field coil is coupled to one of the first rotor portion and the first stator portion, and the first rotor portion is rotatable about a motor axis that extends in a first longitudinal direction;
 (c) a second motor sub-unit comprising a second rotor portion, a second stator portion, and a second field coil of the plurality of field coils, wherein the second field coil is coupled to one of the second rotor portion and the second stator portion, and the second rotor portion is rotatable about the motor axis, the second motor sub-unit being axially spaced along the motor axis from the first motor sub-unit, wherein each rotor portion is operable to generate a rotor magnetic field, and each stator portion is operable to generate a stator magnetic field opposing the rotor magnetic field of a corresponding rotor portion thereby driving rotation of the rotor portions; and,
 (d) a motor controller operable to direct electric current through the plurality of field coils thereby generating at least one of the stator magnetic fields and the rotor magnetic fields and driving rotation of the rotor portions;
wherein
the first rotor portion and the second rotor portion rotate in the same rotational direction; and
each rotor portion is drivingly connected to the brushing member by a drive coupling such that rotation of the rotor portions drives rotation of the brushing member, wherein the drive coupling that drivingly connects the first rotor portion to the brushing member extends from the first rotor portion in the first longitudinal direction co-axially with the motor axis and the drive coupling that drivingly connects the second rotor portion to the brushing member extends from the second rotor portion in the first longitudinal direction co-axially with the motor axis.

2. The brush motor of claim 1, wherein each rotor portion is at least partially surrounded by a corresponding stator portion.

3. The brush motor of claim 1, further comprising a third motor sub-unit comprising a third rotor portion, a third stator portion, and a third field coil of the plurality of field coils, wherein the third field coil is coupled to one of the third rotor portion and the third stator portion and the third motor sub-unit is axially spaced along the motor axis from the first motor sub-unit and the second motor sub-unit.

4. The brush motor of claim 3, wherein the first motor sub-unit, second motor sub-unit and the third motor sub-unit are arranged linearly.

5. The brush motor of claim 1, wherein each field coil is angularly spaced apart from each other field coil in a circumferential direction about the motor axis.

6. The brush motor of claim 1, wherein the motor controller is operable to selectively direct the electric current to each of the field coils based on the angular position of the rotor portions.

7. The brush motor of claim 1, wherein the first motor sub-unit is drivingly connected to the second motor sub-unit and the second motor sub-unit is drivingly connected to the brushing member.

8. A motor for use with a household appliance comprising a rotatable output member, the motor comprising:
 (a) a plurality of field coils;
 (b) a first motor sub-unit comprising a first rotor portion, a first stator portion, and a first field coil of the plurality of field coils, wherein the first field coil is coupled to one of the first rotor portion and the first stator portion, and the first rotor portion is rotatable about a motor axis;
 (c) a second motor sub-unit comprising a second rotor portion, a second stator portion, and a second field coil of the plurality of field coils, wherein the second field coil is coupled to one of the second rotor portion and the second stator portion, and the second rotor portion is rotatable about the motor axis, the second motor sub-unit being axially spaced along the motor axis from the first motor sub-unit, wherein each rotor portion is operable to generate a rotor magnetic field, and each stator portion is operable to generate a stator magnetic field opposing the rotor magnetic field of a corresponding rotor portion thereby driving rotation of the rotor portions; and, (d) a motor controller operable to direct electric current through the plurality of field coils thereby generating at least one of the stator magnetic fields and the rotor magnetic fields and driving rotation of the rotor portions;

wherein the first rotor portion and the second rotor portion rotate in the same rotational direction;

each rotor portion is drivingly connectable to the output member such that rotation of the rotor portions drives rotation of the output member; and the motor omits a central drive shaft.

9. The motor of claim 8, wherein each rotor portion is at least partially surrounded by a corresponding stator portion.

10. The motor of claim 8, further comprising a third motor sub-unit comprising a third rotor portion, a third stator portion, and a third field coil of the plurality of field coils, wherein the third field coil is coupled to one of the third rotor portion and the third stator portion and the third motor sub-unit is axially spaced along the motor axis from the first motor sub-unit and the second motor sub-unit.

11. The motor of claim 10, wherein the first motor sub-unit, second motor sub-unit and the third motor sub-unit are arranged linearly.

12. The motor of claim 8, wherein each field coil is angularly spaced apart from each other field coil in a circumferential direction about the motor axis.

13. The motor of claim 8, wherein the motor controller is operable to selectively direct the electric current to each of the field coils based on the angular position of the rotor portions.

14. The motor of claim 8, wherein the first motor sub-unit is drivingly connected to the second motor sub-unit and the second motor sub-unit is drivingly connected to the brushing member.

15. A surface cleaning apparatus comprising:
(a) a dirt inlet;
(b) a rotatable brushing member having first and second longitudinally opposed ends and a brush member rotational axis extending longitudinally between the first and second opposed ends; and
(c) a brush motor drivingly connected to the rotatable brushing member, the brush motor comprising:
  (i) a plurality of field coils;
  (ii) a first motor sub-unit comprising a first rotor portion, a first stator portion, and a first field coil of the plurality of field coils, wherein the first field coil is coupled to one of the first rotor portion and the first stator portion, and the first rotor portion is rotatable about a motor axis;
  (iii) a second motor sub-unit comprising a second rotor portion, a second stator portion, and a second field coil of the plurality of field coils, wherein the second field coil is coupled to one of the second rotor portion and the second stator portion, and the second rotor portion is rotatable about the motor axis, the second motor sub-unit being axially spaced along the motor axis from the first motor sub-unit, wherein each rotor portion is operable to generate a rotor magnetic field, and each stator portion is operable to generate a stator magnetic field opposing the rotor magnetic field of a corresponding rotor portion thereby driving rotation of the rotor portions; and,
  (iv) a motor controller operable to direct electric current through the plurality of field coils thereby generating at least one of the stator magnetic fields and the rotor magnetic fields and driving rotation of the rotor portions;

wherein the first rotor portion and the second rotor portion rotate in the same rotational direction; and each rotor portion is drivingly connected to the brushing member proximate the second end of the rotatable brushing member by a drive coupling such that rotation of the rotor portions drives rotation of the brushing member.

16. The surface cleaning apparatus of claim 15, wherein the brushing member comprises a member cavity defining an inner member volume surrounded by the brushing member and the brush motor is disposed within the inner member volume.

17. The surface cleaning apparatus of claim 16, wherein the brushing member comprises one or more flaps extending from the brushing member into the inner member volume, and the one or more flaps are thermally coupled to the brush motor within the inner member volume thereby promoting heat transfer between the brush motor and the brushing member.

18. The surface cleaning apparatus of claim 16, further comprising a thermally conductive fill enclosed within the inner member volume, the thermally conductive fill promoting heat transfer between the brush motor and the brushing member.

19. The surface cleaning apparatus of claim 15, wherein:
the surface cleaning apparatus defines a cleaning head housing; and
the brush motor and brushing member are both disposed within the cleaning head housing.

20. The surface cleaning apparatus of claim 15, wherein the brush motor further comprise a third motor sub-unit comprising a third rotor portion, a third stator portion, and a third field coil of the plurality of field coils, wherein the third field coil is coupled to one of the third rotor portion and the third stator portion and the third motor sub-unit is axially spaced along the motor axis from the first motor sub-unit and the second motor sub-unit.

* * * * *